US012106767B2

(12) United States Patent
Kamamoto et al.

(10) Patent No.: US 12,106,767 B2
(45) **Date of Patent: *Oct. 1, 2024**

(54) PITCH EMPHASIS APPARATUS, METHOD AND PROGRAM FOR THE SAME

(71) Applicant: NIPPON TELEGRAPH AND TELEPHONE CORPORATION, Tokyo (JP)

(72) Inventors: Yutaka Kamamoto, Tokyo (JP); Ryosuke Sugiura, Tokyo (JP); Takehiro Moriya, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,562

(22) Filed: Jul. 7, 2023

(65) Prior Publication Data

US 2023/0386498 A1 Nov. 30, 2023

Related U.S. Application Data

(63) Continuation of application No. 17/900,432, filed on Aug. 31, 2022, now Pat. No. 11,749,295, which is a (Continued)

(30) Foreign Application Priority Data

May 10, 2018 (JP) ................................ 2018-091200

(51) Int. Cl.
*G10L 19/00* (2013.01)
*G10L 21/00* (2013.01)
(Continued)

(52) U.S. Cl.
CPC ...... *G10L 21/0364* (2013.01); *G10L 21/0332* (2013.01); *G10L 25/90* (2013.01)

(58) Field of Classification Search
None
See application file for complete search history.

(56) References Cited

U.S. PATENT DOCUMENTS 4,850,022 A * 7/1989 Honda .................... G10L 19/06 704/214
5,617,507 A * 4/1997 Lee ......................... G10L 21/04 704/E13.007
(Continued)

FOREIGN PATENT DOCUMENTS

JP H10-143195 A 5/1998
JP 2002221998 A * 8/2002 ........... G10L 19/012
JP 2004053676 A * 2/2004
JP 2004302257 A * 10/2004

OTHER PUBLICATIONS

International Telecommunication Union (2006) "Dual rate speech coder for multimedia communications transmitting at 5.3 and 6.3 kbit/s," ITU-T Recommendation G.723.1 (May 2006) pp. 16-18.

*Primary Examiner* — Shreyans A Patel

(57) ABSTRACT

Provided is pitch enhancement processing having little unnaturalness even in time segments for consonants, and having little unnaturalness to listeners caused by discontinuities even when time segments for consonants and other time segments switch frequently. A pitch emphasis apparatus carries out the following as the pitch enhancement processing: for a time segment in which a spectral envelope of a signal has been determined to be flat, obtaining an output signal for each of times in the time segment, the output signal being a signal including a signal obtained by adding (1) a signal obtained by multiplying the signal of a time, further in the past than the time by a number of samples $T_0$ corresponding to a pitch period of the time segment, a pitch
(Continued)

gain $\sigma_0$ of the time segment, a predetermined constant $B_0$, and a value greater than 0 and less than 1, to (2) the signal of the time.

6 Claims, 4 Drawing Sheets

Related U.S. Application Data continuation of application No. 17/053,698, filed as application No. PCT/JP2019/017137 on Apr. 23, 2019, now Pat. No. 11,468,907.

(51) Int. Cl.

| | |
|---|---|
| ***G10L 21/0332*** | (2013.01) |
| ***G10L 21/0364*** | (2013.01) |
| ***G10L 25/90*** | (2013.01) |

(56) References Cited

U.S. PATENT DOCUMENTS

| | | | | |
|---|---|---|---|---|
| 11,468,907 | B2 * | 10/2022 | Kamamoto | G10L 19/26 |
| 11,749,295 | B2 * | 9/2023 | Kamamoto | G10L 19/26 704/211 |
| 2007/0271319 | A1 * | 11/2007 | Smith | G06F 17/14 708/290 |
| 2009/0306971 | A1 * | 12/2009 | Kim | G10L 21/0364 704/203 |
| 2015/0302859 | A1 * | 10/2015 | Aguilar | G10L 19/002 704/211 |
| 2016/0322066 | A1 * | 11/2016 | Sharifi | G06F 16/683 |
| 2017/0092258 | A1 * | 3/2017 | Edrenkin | G10L 13/08 |
| 2017/0133029 | A1 * | 5/2017 | Markovic | G10L 19/12 |
| 2021/0090586 | A1 * | 3/2021 | Kamamoto | G10L 21/034 |
| 2021/0090587 | A1 * | 3/2021 | Kamamoto | G10L 25/90 |
| 2021/0233549 | A1 * | 7/2021 | Kamamoto | G10L 21/034 |
| 2022/0415341 | A1 * | 12/2022 | Kamamoto | G10L 19/26 |
| 2023/0386498 | A1 * | 11/2023 | Kamamoto | G10L 21/013 |

* cited by examiner

PITCH EMPHASIS APPARATUS, METHOD AND PROGRAM FOR THE SAME

CROSS-REFERENCE TO RELATED APPLICATIONS

This application is a continuation application and claims priority to U.S. patent application Ser. No. 17/900,432, filed Aug. 31, 2022, which is a continuation application of U.S. patent application Ser. No. 17/053,698, filed Nov. 6, 2020, which application is a U.S. National Stage Application filed under 35 U.S.C. § 371 claiming priority to International Patent Application No. PCT/JP2019/017137, filed 23 Apr. 2019, which application claims priority to and the benefit of JP Application No. 2018-091200, filed on 10 May 2018, the disclosures of which are hereby incorporated herein by reference in their entireties.

TECHNICAL FIELD

This invention relates to analyzing and enhancing a pitch component of a sample sequence originating from an audio signal, in a signal processing technique such as an audio signal encoding technique.

BACKGROUND ART

Typically, when a sample sequence such as a time-series signal is subjected to lossy coding, the sample sequence obtained during decoding is a distorted sample sequence and is thus different from the original sample sequence. When coding audio signals in particular, the distortion often contains patterns not found in natural sounds, and the decoded audio signal may therefore feel unnatural to listeners. As such, focusing on the fact that many natural sounds contain periodic components based on sound when observed in a set section, i.e., contain a pitch, techniques which convert an audio signal to more natural sound by carrying out processing for enhancing a pitch component are commonly used, where an amount of past samples equivalent to the pitch period is added for each sample in an audio signal obtained from decoding. (e.g., Non-patent Literature 1).

There are also techniques such as that described in Patent Literature 1, for example, where based on information indicating whether an audio signal obtained from decoding is “voice” or “not voice”, processing for enhancing a pitch component is carried out when the audio signal is “voice”, whereas the processing for enhancing a pitch component is not carried out when the audio signal is “not voice”.

CITATION LIST

Non-Patent Literature

[Non-patent Literature 1] ITU-T Recommendation G.723.1 (05/2006) pp. 16-18, 2006

Patent Literature

[Patent Literature 1] Japanese Patent Application Publication No. H10-143195

SUMMARY OF THE INVENTION

Technical Problem

However, the technique disclosed in Non-patent Literature 1 has a problem in that the processing for enhancing pitch components is carried out even on consonant parts which have no clear pitch structure, which results in those consonant parts sounding unnatural to listeners. On the other hand, the technique disclosed in Patent Literature 1 does not carry out any processing for enhancing pitch components, even when a pitch component is present as a signal in a consonant part, which results in those consonant parts sounding unnatural to listeners. The technique disclosed in Patent Literature 1 also has a problem in that whether or not the pitch enhancement processing is carried out switches between time segments for vowels and time segments for consonants, resulting in frequent discontinuities in the audio signal and increasing the sense of unnaturalness to listeners.

With the foregoing in view, an object of the present invention is to realize pitch enhancement processing having little unnaturalness even in time segments for consonants, and having little unnaturalness to listeners caused by discontinuities even when time segments for consonants and other time segments switch frequently. Note that consonants include fricatives, plosivs, semivowels, nasals, and affricates (see Reference Document 1 and Reference Document 2).

[Reference Document 1] Furui, S. *Acoustic and Audio Engineering*. Kindai Kagakusha, 1992, p. 99

[Reference Document 2] Saito, S. and Tanaka, K. *Fundamentals of Voice Information Processing*. Ohmsha, 1981, p. 38-39

Means for Solving the Problem

To solve the above-described problems, according to one aspect of the present invention, a pitch emphasis apparatus obtains an output signal by executing pitch enhancement processing on each of time segments of a signal originating from an input audio signal. The pitch emphasis apparatus includes a pitch enhancing unit that carries out the following as the pitch enhancement processing: for a time segment in which a spectral envelope of the signal has been determined to be flat, obtaining an output signal for each of times in the time segment, the output signal being a signal including a signal obtained by adding (1) a signal obtained by multiplying the signal of a time, further in the past than the time by a number of samples $T_0$ corresponding to a pitch period of the time segment, a pitch gain $\sigma_0$ of the time segment, a predetermined constant $B_0$, and a value greater than 0 and less than 1, to (2) the signal of the time, and for a time segment in which a spectral envelope of the signal has been determined not to be flat, obtaining an output signal for each of times in the time segment, the output signal being a signal including a signal obtained by adding (1) a signal obtained by multiplying the signal of a time, further in the past than the time by the number of samples $T_0$ corresponding to the pitch period of the time segment, the pitch gain $\sigma_0$ of the time segment, and the predetermined constant $B_0$, to (2) the signal of the time.

To solve the above-described problems, according to another aspect of the present invention, a pitch emphasis apparatus obtains an output signal by executing pitch enhancement processing on each of time segments of a signal originating from an input audio signal. The pitch emphasis apparatus includes a pitch enhancing unit that carries out the following as the pitch enhancement processing: obtaining an output signal for each of times n in each of the time segments, the output signal being a signal including a signal obtained by adding (1) a signal obtained by multiplying the signal of a time, further in the past than the time n by a number of samples $T_0$ corresponding to a pitch period of the time segment, a pitch gain $\sigma_0$ of the time segment, and a value that is lower the flatter a spectral envelope of the time segment is, to (2) the signal of the time n.

Effects of the Invention

The present invention makes it possible to achieve an effect of realizing pitch enhancement processing in which, when the pitch enhancement processing is executed on a voice signal obtained from decoding processing, there is little unnaturalness even in time segments for consonants, and there is little unnaturalness to listeners caused by discontinuities even when time segments for consonants and other time segments switch frequently.

DESCRIPTION OF EMBODIMENTS

Figure 1:
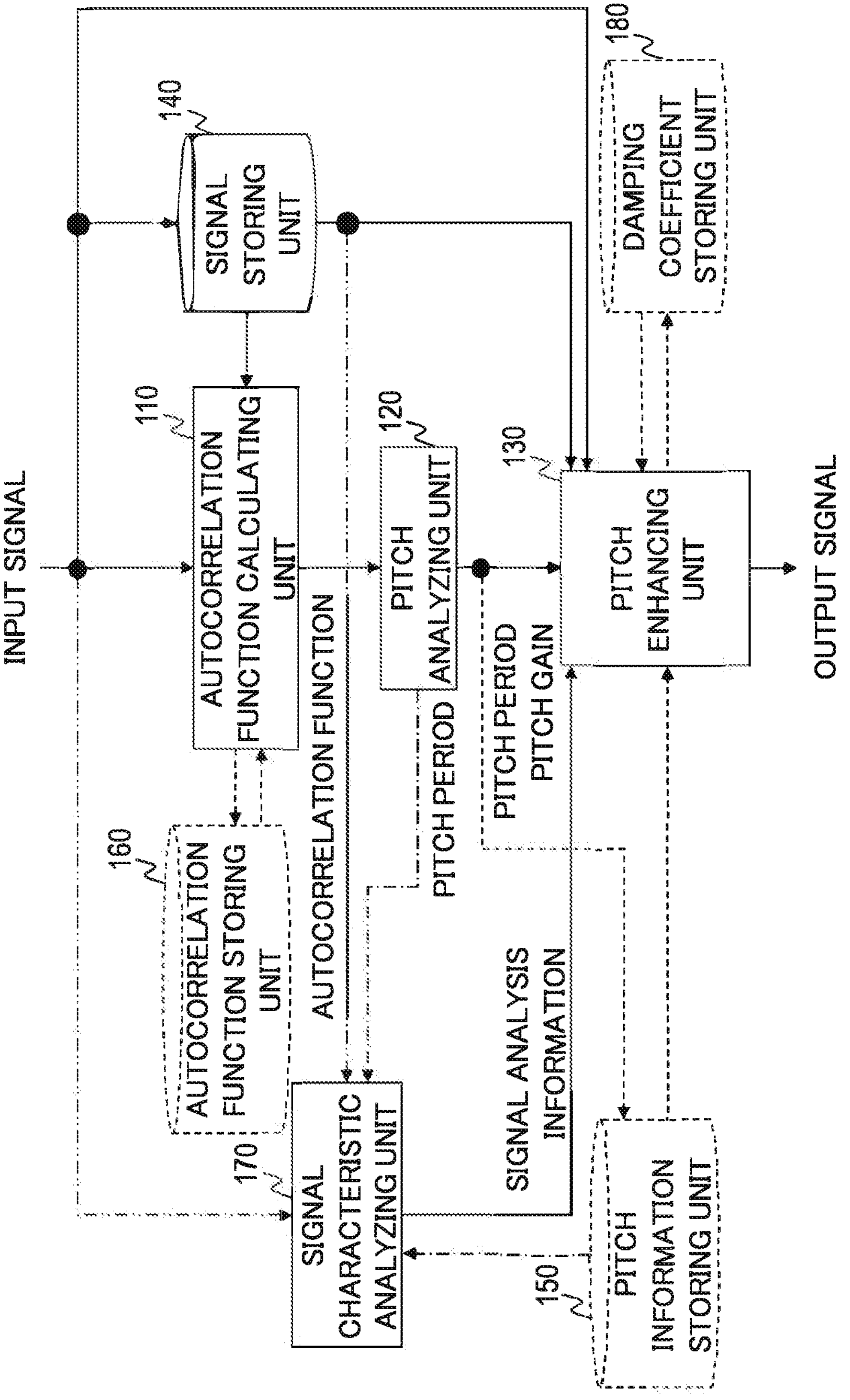
FIG. 1 is a function block diagram illustrating a pitch emphasis apparatus according to a first embodiment, a second embodiment, a third embodiment, and variations thereon.

Embodiments of the present invention will be described hereinafter. Note that in the drawings referred to in the following descriptions, constituent elements having the same functions, steps performing the same processing, and the like are given the same reference signs, and redundant descriptions thereof will not be given. Unless otherwise specified, the following descriptions assume that processing carried out in units of vectors, elements in matrices, and so on are applied to all of those vectors, elements in the matrices, and so on.

First Embodiment

Figure 2:
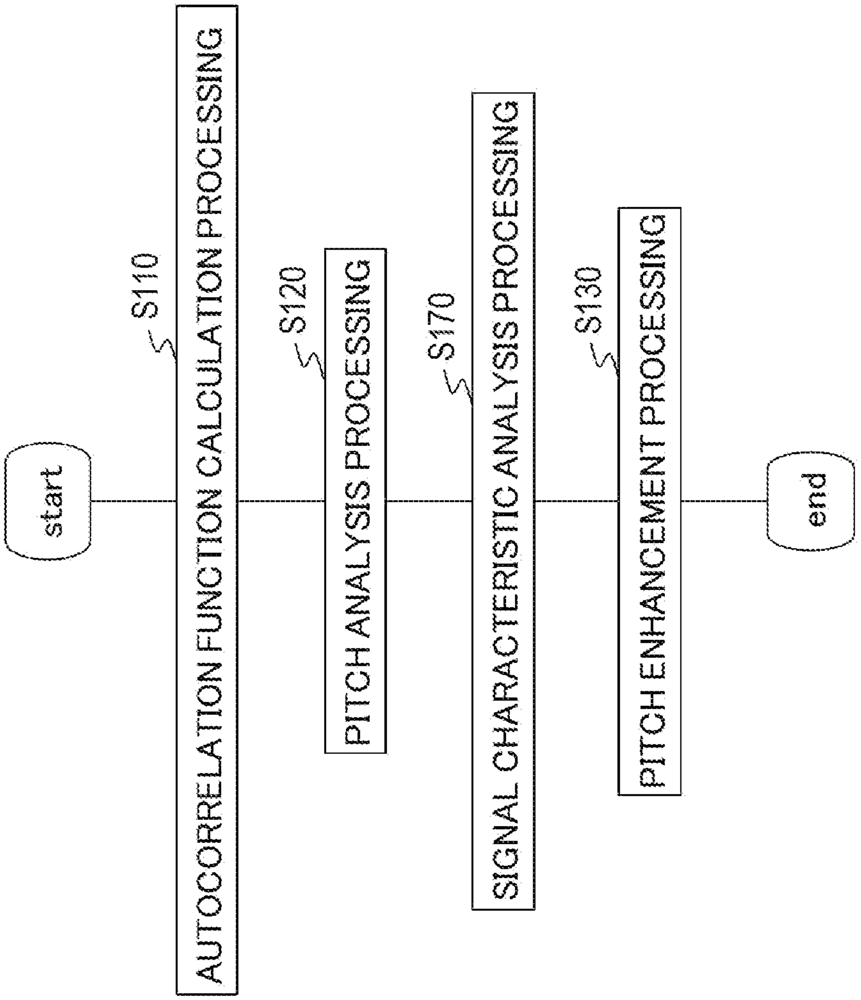
FIG. 2 is a diagram illustrating an example of a flow of processing by the pitch emphasis apparatus according to the first embodiment, the second embodiment, the third embodiment, and variations thereon.

FIG. 1 is a function block diagram illustrating a voice pitch emphasis apparatus according to a first embodiment, and FIG. 2 illustrates a flow of processing by the apparatus.

A processing sequence carried out by the voice pitch emphasis apparatus according to the first embodiment will be described with reference to FIG. 1. The voice pitch emphasis apparatus according to the first embodiment analyzes an input signal to obtain a pitch period and a pitch gain, and then enhances the pitch on the basis of the pitch period and the pitch gain. In the present embodiment, when executing pitch enhancement processing using a result of multiplying a pitch component, which corresponds to the pitch period for an input audio signal in each of time segments, by the pitch gain, the degree to which the pitch component is enhanced in a time segment having a spectral envelope that is flat is set to be lower than the degree to which the pitch component is enhanced in a time segment having a spectral envelope that is not flat. Alternatively, the pitch component in a time segment is enhanced to a lower degree the flatter the spectral envelope is. To be more specific, a value obtained by multiplying the pitch gain by a value lower than 1 is used instead of the pitch gain for time segments in which the spectral envelope is flat. The spectra of consonants have a property where the spectral envelope is flatter compared to vowels. In the present embodiment, the degree of enhancement is changed using this property in order to solve the problems described above.

The voice pitch emphasis apparatus according to the first embodiment includes a signal characteristic analyzing unit 170, an autocorrelation function calculating unit 110, a pitch analyzing unit 120, a pitch enhancing unit 130, and a signal storing unit 140, and may further include a pitch information storing unit 150, an autocorrelation function storing unit 160, and a damping coefficient storing unit 180.

The voice pitch emphasis apparatus is a special device configured by loading a special program into a common or proprietary computer having a central processing unit (CPU), a main storage device (RAM: random access memory), and the like, for example. The voice pitch emphasis apparatus executes various types of processing under the control of the central processing unit, for example. Data input to the voice pitch emphasis apparatus, data obtained from the various types of processing, and the like is stored in the main storage device, for example, and the data stored in the main storage device is read out to the central processing unit and used in other processing as necessary. The various processing units of the voice pitch emphasis apparatus may be at least partially constituted by hardware such as an integrated circuit or the like. The various storage units included in the voice pitch emphasis apparatus can be constituted by, for example, the main storage device such as RAM (random access memory), or by middleware such as relational databases, key value stores, and so on. However, the storage units do not absolutely have to be provided within the voice pitch emphasis apparatus, and may be constituted by auxiliary storage devices such as a hard disk, an optical disk, or a semiconductor memory device such as Flash memory, and provided outside the voice pitch emphasis apparatus.

The main processing carried out by the voice pitch emphasis apparatus according to the first embodiment is autocorrelation function calculation processing (S110), pitch analysis processing (S120), signal characteristic analysis processing (S170), and pitch enhancement processing (S130) (see FIG. 2), and since these instances of processing are carried out by a plurality of hardware resources included in the voice pitch emphasis apparatus operating cooperatively, the autocorrelation function calculation processing (S110), the pitch analysis processing (S120), the signal characteristic analysis processing (S170), and the pitch enhancement processing (S130) will each be described hereinafter along with processing related thereto.

[Autocorrelation Function Calculation Processing (S110)]

First, the autocorrelation function calculation processing, and processing related thereto, carried out by the voice pitch emphasis apparatus, will be described.

A time-domain audio signal (an input signal) is input to the autocorrelation function calculating unit 110. The audio signal is a signal obtained by first encoding an acoustic signal such as a voice signal into code using a coding device, and then decoding the code using a decoding device corresponding to the coding device. A sample sequence of the time-domain audio signal from a current frame input to the voice pitch emphasis apparatus is input to the autocorrelation function calculating unit 110, in units of frames of a predetermined length of time (time segments). When a positive integer indicating the length of one frame's worth of the sample sequence is represented by N, N time-domain audio signal samples constituting the sample sequence of the time-domain audio signal in the current frame are input to the autocorrelation function calculating unit 110. The autocorrelation function calculating unit 110 calculates an autocorrelation function $R_0$ for a time difference 0 and autocorrelation functions $R_{\tau(1)}, \ldots, R_{\tau(M)}$ for each of a plurality of (M; M is a positive integer) predetermined time differences $\tau(1), \ldots, \tau(M)$, in a sample sequence constituted by the newest L audio signal samples (where L is a positive integer) including the input N time-domain audio signal samples. In other words, the autocorrelation function calculating unit 110 calculates an autocorrelation function for the sample sequence constituted by the newest audio signal samples including the time-domain audio signal samples in the current frame.

Note that in the following, the autocorrelation function calculated by the autocorrelation function calculating unit 110 in the processing for the current frame, i.e., the autocorrelation function for the sample sequence constituted by the newest audio signal samples including the time-domain audio signal samples in the current frame, will be called the "autocorrelation function of the current frame". Likewise, when a given past frame is taken as a frame F, the autocorrelation function calculated by the autocorrelation function calculating unit 110 in the processing of the frame F, i.e., the autocorrelation function for the sample sequence constituted by the newest audio signal samples at the point in time of the frame F, including the time-domain audio signal samples in the frame F, will be called the "autocorrelation function of the frame F". The "autocorrelation function" may also be called simply the "autocorrelation". To enable the use of the newest L audio signal samples in the autocorrelation function calculation when the value of L is greater than N, the voice pitch emphasis apparatus includes the signal storing unit 140, which makes it possible to store at least the newest L–N audio signal samples input up to one frame previous. Then, when the N time-domain audio signal samples in the current frame have been input, the autocorrelation function calculating unit 110 obtains the newest L audio signal samples $X_0, X_1, \ldots, X_{L-1}$ by reading out the newest L–N audio signal samples stored in the signal storing unit 140 as $X_0, X_1, \ldots, X_{L-N-1}$ and then taking the input N time-domain audio signal samples as $X_{L-N}, X_{L-N+1}, X_{L-1}$.

Then, using the newest L audio signal samples $X_0, X_1, \ldots, X_{L-1}$, the autocorrelation function calculating unit 110 calculates the autocorrelation function $R_0$ of the time difference and the autocorrelation functions $R_{\tau(1)}, R_{\tau(M)}$ for the corresponding plurality of predetermined time differences $\tau(1), \tau(M)$. When the time differences such as $\tau(1), \ldots, \tau(M)$ and 0 are represented by $\tau$, the autocorrelation function calculating unit 110 calculates the autocorrelation functions $R_\tau$ through the following Expression (1), for example.

[Formula 1]

$$R_\tau = \sum_{l=\tau}^{L-1} X_l X_{l-\tau} \tag{1}$$

The autocorrelation function calculating unit 110 outputs the calculated autocorrelation functions $R_0, R_{\tau(1)}, \ldots, R_{\tau(M)}$ to the pitch analyzing unit 120.

Note that these time differences $\tau(1), \tau(M)$ are candidates for a pitch period $T_0$ in the current frame, found by the pitch analyzing unit 120, which will be described later. For example, assuming an audio signal constituted primarily by a voice signal with a sampling frequency of 32 kHz, an implementation such as where integer values from 75 to 320, which are favorable as candidates for the pitch period of voice, are taken as $\tau(1), \ldots, \tau(M)$ is conceivable. Note that instead of $R_\tau$ in Expression (1), a normalized autocorrelation function $R_\tau/R_0$ may be found by dividing RT in Expression (1) by $R_0$. However, if L is, for example, a value much higher than the candidates of 75 to 320 for the pitch period $T_0$, such as 8192, it is better to calculate the autocorrelation function $R_\tau$ through the method described below, which suppresses the amount of computations, than find the normalized autocorrelation function $R_\tau/R_0$ instead of the autocorrelation function $R_\tau$.

The autocorrelation function $R_\tau$ may be calculated using Expression (1) itself, or the same value as that found using Expression (1) may be calculated using another calculation method. For example, by providing the autocorrelation function storing unit 160 in the voice pitch emphasis apparatus, the autocorrelation functions $R_{\tau(1)}, \ldots, R_{\tau(M)}$ (the autocorrelation function for the frame immediately previous), obtained through the processing for calculating the autocorrelation function for one frame previous (the frame immediately previous), may be stored, and the autocorrelation function calculating unit 110 may calculate the autocorrelation functions $R_{\tau(1)}, R_{\tau(M)}$ of the current frame by adding the extent of contribution of the newly-input audio signal sample of the current frame and subtracting the extent of contribution of the oldest frame for each of the autocorrelation functions $R_{\tau(1)}, \ldots, R_{\tau(M)}$ (the autocorrelation function for the frame immediately previous) obtained through the processing of the immediately-previous frame read out from the autocorrelation function storing unit 160. Accordingly, the amount of computations required to calculate the autocorrelation functions can be suppressed more than when using Expression (1) itself for the calculation. In this case, assuming that $\tau(1), \ldots, \tau(M)$ are each $\tau$, the autocorrelation function calculating unit 110 obtains the autocorrelation function $R_\tau$ of the current frame by adding a difference $Or^+$ obtained through the following Expression (2), and subtracting a difference $\Delta R_\tau^-$ obtained through the following Expression (3), to and from the autocorrelation function $R_\tau$ obtained in the processing of the frame immediately previous (the autocorrelation function $R_\tau$ of the frame immediately previous).

[Formula 2]

$$\Delta R_\tau^+ = \sum_{l=L-N}^{L-1} X_l X_{l-\tau} \tag{2}$$

$$\Delta R_\tau^- = \sum_{l=\tau}^{N-1+\tau} X_l X_{l-\tau} \tag{3}$$

Additionally, the amount of computations may be reduced by calculating the autocorrelation function through processing similar to that described above, but using a signal in which the number of samples has been reduced by downsampling the L audio signal samples, thinning the samples, or the like, rather than the newest L audio signal samples of the input signal themselves. In this case, the M time differences $\tau(1), \ldots, \tau(M)$ are expressed as, for example, half the number of samples, if the number of samples have been halved. For example, if the above-described 8192 audio signal samples at a sampling frequency of 32 kHz have been downsampled to 4096 samples at a sampling frequency of 16 kHz, $\tau(1), \ldots, \tau(M)$, which are the candidates for the pitch period T, may be set to 37 to 160, i.e., approximately half of 75 to 320.

Note that the audio signal samples stored in the signal storing unit 140 are also used in the signal characteristic analysis processing, which will be described later. Specifically, J−N (where J is a positive integer) audio signal samples stored in the signal storing unit 140 are used in the signal characteristic analysis processing, which will be described later. In other words, when the higher value of L and J is taken as K (i.e., assuming K=max(L, J)), it is necessary to store at least the newest K−N audio signal samples, which have been input up to one frame previous, in the signal storing unit 140. Accordingly, after the voice pitch emphasis apparatus has completed processing up to that carried out by the pitch enhancing unit 130 (described later) for the current frame, the signal storing unit 140 updates the stored content so that the newest K−N audio signal samples at that point in time are stored. Specifically, when, for example, K>2N, the signal storing unit 140 deletes the N oldest audio signal samples $XR_0, XR_1, \ldots, XR_{N-1}$ among the K−N audio signal samples which are stored, takes $XR_N, XR_{N+t}, \ldots, XR_{K-N-1}$ as $XR_0, XR_1, \ldots, XR_{K-2N-1}$, and newly stores the N time-domain audio signal samples of the current frame, which have been input, as $XR_{K-2N}, XR_{L-2N+1}, \ldots, XR_{K-N-1}$. When K≤2N, the signal storing unit 140 deletes the K−N audio signal samples $XR_0, XR_1, \ldots, XR_{K-N-1}$ which are stored, and then newly stores the newest K-N audio signal samples, among the N time-domain audio signal samples in the current frame which have been input, as $XR_0, XR_1, \ldots, XR_{K-N-1}$. Note that the signal storing unit 140 need not be provided in the voice pitch emphasis apparatus when K≤N.

Additionally, after the autocorrelation function calculating unit 110 has finished calculating the autocorrelation functions for the current frame, the autocorrelation function storing unit 160 updates the stored content so as to store the calculated autocorrelation functions $R_{\tau(1)}, R_{\tau(M)}$ of the current frame. Specifically, the autocorrelation function storing unit 160 deletes $R_{\tau(1)}, \ldots, R_{\tau(M)}$ which are stored, and newly stores the calculated autocorrelation functions $R_{\tau(1)}, \ldots, R_{\tau(M)}$ of the current frame.

Although the foregoing descriptions assume that the newest L audio signal samples include the N audio signal samples of the current frame (i.e., that L is greater than or equal to N), L does not absolutely have to be greater than or equal to N, and L may be less than N. In this case, the autocorrelation function calculating unit 110 may calculate the autocorrelation function $R_0$ of the time difference 0 and the autocorrelation functions $R_{\tau(1)}, \ldots, R_{\tau(M)}$ for the corresponding plurality of predetermined time differences $\tau(1), \ldots, \tau(M)$ using L consecutive audio signal samples $X_0, X_1, \ldots, X_{L-1}$ included in the N of the current frame.

[Pitch Analysis Processing (S120)]

The pitch analysis processing carried out by the voice pitch emphasis apparatus will be described next.

The autocorrelation functions $R_0, R_{\tau(1)}, \ldots, R_{\tau(M)}$ of the current frame, output by the autocorrelation function calculating unit 110, are input to the pitch analyzing unit 120.

The pitch analyzing unit 120 finds a maximum value among the autocorrelation functions $R_{\tau(1)}, \ldots, R_{(M)}$ of the current frame with respect to a predetermined time difference, obtains a ratio of the maximum value of the autocorrelation functions to the autocorrelation function $R_0$ for the time difference 0 as a pitch gain $\sigma_0$ of the current frame, obtains a time difference at which the autocorrelation function is at the maximum value as the pitch period $T_0$ of the current frame, and outputs these to the pitch enhancing unit 130.

[Signal Characteristic Analysis Processing (S170)]

The signal characteristic analysis processing carried out by the voice pitch emphasis apparatus will be described next.

Information originating from the time-domain audio signal is input to the signal characteristic analyzing unit 170. This audio signal is the same signal as the audio signal input to the autocorrelation function calculating unit 110.

For example, a sample sequence of the time-domain audio signal in the current frame input to the voice pitch emphasis apparatus is input to the signal characteristic analyzing unit 170, in units of frames of a predetermined length of time (time segments). In other words, N time-domain audio signal samples constituting the sample sequence of the time-domain audio signal in the current frame are input to the signal characteristic analyzing unit 170. In this case, using a sample sequence constituted by the newest J audio signal samples (where J is a positive integer) including the N time-domain audio signal samples which have been input, the signal characteristic analyzing unit 170 obtains information expressing whether or not a spectral envelope of the current frame is flat or an index value indicating a degree of flatness of the spectral envelope of the current frame, and outputs the information or index value to the pitch enhancing unit 130 as signal analysis information $I_0$. In other words, in this case, the "information originating from the time-domain audio signal" is a sample sequence of the time-domain audio signal of the current frame (indicated by the double-dot-dash line in FIG. 1).

As described earlier, the spectra of consonants have a property where the spectral envelope is flatter compared to vowels. Accordingly, the "index value of the degree of flatness of the spectral envelope" is also called an "index value indicating the consonant-likeness", and the "information expressing whether or not the spectral envelope is flat" is also called "information expressing whether or not the current frame is a consonant".

The signal characteristic analyzing unit 170 obtains the signal analysis information $I_0$ through the signal characteristic analysis processing in the following Example 1-1 to Example 1-7, for example.

(Example 1-1 of Signal Characteristic Analysis Processing: Example of Taking Index Value Indicating Degree of Flatness of Spectral Envelope as Signal Analysis Information (1))

In this example, the signal characteristic analyzing unit 170 first obtains T-dimensional LSP parameters $\theta[1], \theta[2], \ldots, \theta[T]$ from a sample sequence constituted by the newest J audio signal samples including the N time-domain audio signal samples which have been input (Step 1-1-1). Next, using the T-dimensional LSP parameters $\theta[1], \theta[2], \ldots, \theta[T]$ obtained in Step 1-1-1, the signal characteristic analyzing unit 170 obtains an index Q, indicated below, as the index value indicating the degree of flatness of the spectral envelope of the current frame (also called a "1-1th index value indicating the consonant-likeness") (Step 1-1-2).

[Formula 3]

$$Q = \frac{1}{\frac{1}{(T-1)}\sum_{i}^{T-1}\left(\bar{\theta} - \theta[i+1] + \theta[i]\right)^2} \text{ where } \tag{11}$$

$$\bar{\theta} = \frac{1}{(T-1)}\sum_{i}^{T-1}(\theta[i+1] - \theta[i])$$

(Example 1-2 of Signal Characteristic Analysis Processing: Example of Taking Index Value Indicating Degree of Flatness of Spectral Envelope as Signal Analysis Information (2))

In this example, the signal characteristic analyzing unit 170 first obtains T-dimensional LSP parameters θ[1], θ[2], . . . , θ[T] from a sample sequence constituted by the newest J audio signal samples including the N time-domain audio signal samples which have been input (Step 1-2-1). Next, using the T-dimensional LSP parameters θ[1], θ[2], . . . , θ[T] obtained in Step 1-2-1, the signal characteristic analyzing unit 170 obtains a minimum value of intervals between neighboring LSP parameters, i.e., an index Q', indicated below, as the index value indicating the degree of flatness of the spectral envelope of the current frame (also called a "1-2th index value indicating the consonant-likeness") (Step 1-2-2).

[Formula 4]

$$Q' = \min_{i \in \{1, \ldots, T-1\}} (\theta[i+1] - \theta[i]) \tag{12}$$

(Example 1-3 of Signal Characteristic Analysis Processing: Example of Taking Index Value Indicating Degree of Flatness of Spectral Envelope as Signal Analysis Information (3))

In this example, the signal characteristic analyzing unit 170 first obtains T-dimensional LSP parameters θ[1], θ[2], . . . , θ[T] from a sample sequence constituted by the newest J audio signal samples including the N time-domain audio signal samples which have been input (Step 1-3-1). Next, using the T-dimensional LSP parameters θ[1], θ[2], . . . , θ[T] obtained in Step 1-3-1, the signal characteristic analyzing unit 170 obtains a minimum value among the values of intervals between neighboring LSP parameters and the values of the lowest dimensional LSP parameters, i.e., an index Q", indicated below, as the index value indicating the degree of flatness of the spectral envelope of the current frame (also called a "1-3th index value indicating the consonant-likeness") (Step 1-3-2).

[Formula 5]

$$Q'' = \min(\min_{i \in \{1, \ldots, T-1\}} (\theta[i+1] - \theta[i]), \theta[1]]) \tag{13}$$

(Example 1-4 of Signal Characteristic Analysis Processing: Example of Taking Index Value Indicating Degree of Flatness of Spectral Envelope as Signal Analysis Information (4))

In this example, the signal characteristic analyzing unit 170 first obtains p-dimensional PARCOR coefficients k[1], k[2], . . . , k[p] from a sample sequence constituted by the newest J audio signal samples including the N time-domain audio signal samples which have been input (Step 1-4-1). Next, using the p-dimensional PARCOR coefficients k[1], k[2], . . . , k[p] obtained in Step 1-4-1, the signal characteristic analyzing unit 170 obtains an index Q"', indicated below, as the index value indicating the degree of flatness of the spectral envelope of the current frame (also called a "1-4th index value indicating the consonant-likeness") (Step 1-4-2).

[Formula 6]

$$Q''' = \prod_{i}^{p}(1 - k[i]^2) \tag{14}$$

(Example 1-5 of Signal Characteristic Analysis Processing: Example of Taking Index Value Obtained by Combining Plurality of Index Values as Signal Analysis Information)

In this example, the signal characteristic analyzing unit 170 obtains the 1-1th to 1-4th index values indicating the consonant-likeness through the methods according to Example 1-1 to Example 1-4 (Step 1-5-1). Then, through weighted adding of the 1-1th to 1-4th index values indicating the consonant-likenesses obtained in Step 1-5-1, the signal characteristic analyzing unit 170 further obtains a value that increases as the 1-1th index value increases, increases as the 1-2th index value increases, increases as the 1-3th index value increases, and increases as the 1-4th index value increases, as the index value indicating the consonant-likeness of the current frame (also called a "1-5th index value" for the sake of simplicity), and then outputs the obtained 1-5th index value as the signal analysis information $I_0$ (Step 1-5-2).

As described earlier, the 1-1th to 1-4th index values indicating the consonant-likeness are indices expressing the consonant-likeness. In this example, the index value indicating the consonant-likeness can be set more flexibly by combining the four index values.

Note that the signal characteristic analyzing unit 170 may obtain at least two of the 1-1th to 1-4th index values indicating the consonant-likeness (Step 1-5-1'), use weighted adding of the at least two index values indicating the consonant-likeness obtained in Step 1-5-1' to obtain a value that increases as the index values obtained in Step 1-5-1' increase as a 1-5th index value indicating the consonant-likeness of the current frame, and output the obtained 1-index value as the signal analysis information $I_0$ (Step 1-5-2').

Examples 1-1 to 1-5 of the signal characteristic analysis processing describe examples of taking an index value indicating the degree of flatness of the spectral envelope (an index value indicating the consonant-likeness) as signal analysis information. Next, examples of taking the information expressing whether or not the spectral envelope is flat (information expressing whether or not the current frame is a consonant) as the signal analysis information will be described.

(Example 1-6 of Signal Characteristic Analysis Processing: Example of Taking Information Expressing Whether or not Spectral Envelope is Flat as Signal Analysis Information (1))

In this example, the signal characteristic analyzing unit 170 first obtains any one of the 1-1th to 1-5th index values indicating the consonant-likeness of the current frame through the same method as any one of those according to Example 1-1 to Example 1-5 (Step 1-6-1). Next, when the index value obtained in Step 1-6-1 is greater than or equal to a pre-set threshold or exceeds the threshold, the signal characteristic analyzing unit 170 outputs information expressing that the current frame is a consonant (the "information expressing whether or not the current frame is a consonant" corresponding to the "1-1th index value" to the "1-5th index value" will also be called "1-1th information" to "1-5th information", respectively, for the sake of simplicity) as the signal analysis information $I_0$; whereas when such is not the case, any one of 2-1th to 2-5th information expressing that the current frame is not a consonant is output as the signal analysis information $I_0$ (Step 1-6-2).

(Example 1-7 of Signal Characteristic Analysis Processing: Example of Taking Information Expressing Whether or not Spectral Envelope is Flat as Signal Analysis Information (2))

In this example, the signal characteristic analyzing unit 170 first obtains the 1-1th to 1-4th index values indicating the consonant-likeness of the current frame through the same methods as those according to Example 1-1 to Example 1-4 (Step 1-7-1). Next, on the basis of a magnitude relationship between each of the four 1-1th to 1-4th index values indicating the consonant-likeness obtained in Step 1-7-1 and a pre-set threshold, the signal characteristic analyzing unit 170 obtains information expressing that the current frame is a consonant, or information expressing that the current frame is not a consonant, for each of the 1-1th to 1-4th index values indicating the consonant-likeness (Step 1-7-2). Note that a threshold is set for each of the four 1-1th to 1-4th index values, and the information expressing whether or not the current frame is a consonant corresponding to the 1-1th to 1-4th index values is also called 1-1th to 1-4th information, respectively. For example, when the 1-1th index value is greater than or equal to a pre-set threshold or exceeds the threshold, 1-1th information expressing that the current frame is a consonant is obtained; whereas when such is not the case, 1-1th information expressing that the current frame is not a consonant is obtained. Likewise, the 1-2th to 1-4th information is obtained on the basis of a magnitude relationship between the 1-2th to 1-4th index values and pre-set thresholds.

On the basis of logic operations on the four pieces of 1-1th to 1-4th information, the signal characteristic analyzing unit 170 obtains information expressing that the current frame is a consonant (also called "1-6th information" for the sake of simplicity) or 1-6th information expressing that the current frame is not a consonant (Step 1-7-3).

Example 1 of Logic Operation

For example, if all of the 1-1th to 1-4th information express consonants, the 1-6th information expressing that the current frame is a consonant is output as the signal analysis information $I_0$, whereas if such is not the case, the 1-6th information expressing that the current frame is not a consonant is output as the signal analysis information $I_0$.

Example 2 of Logic Operation

Additionally, for example, if any one of the 1-1th to 1-4th information expresses a consonant, the 1-6th information expressing that the current frame is a consonant is output as the signal analysis information $I_0$, whereas if such as not the case, the 1-6th information expressing that the current frame is not a consonant is output as the signal analysis information $I_0$.

Example 3 of Logic Operation

Additionally, for example, if any one of the 1-1th and 1-2th information expresses a consonant and any one of the 1-3th and 1-4th information expresses a consonant (when a combination of a logical sum and a logical product is used), the 1-6th information expressing that the current frame is a consonant is output as the signal analysis information $I_0$, whereas if such as not the case, the 1-6th information expressing that the current frame is not a consonant is output as the signal analysis information $I_0$.

Note that the logic operations on the 1-1th to 1-4th information are not limited to the above-described Examples 1 to 3 of logic operations, and may be set appropriately so that the decoded audio signal feels more natural.

Additionally, the signal characteristic analyzing unit 170 may obtain at least two of the 1-1th to 1-4th index values indicating the consonant-likeness (Step 1-7-1'); on the basis of a magnitude relationship between each of the at least two index values indicating the consonant-likeness obtained in Step 1-7-1' and a pre-set threshold, the signal characteristic analyzing unit 170 may obtain at least two pieces of information expressing that the current frame is a consonant or that the current frame is not a consonant, for each of the index values indicating the consonant-likeness (Step 1-7-2'); and on the basis of a logic operation on the at least two pieces of information obtained in Step 1-7-2', the signal characteristic analyzing unit 170 may obtain the 1-6th information expressing that the current frame is a consonant or the 1-6th information expressing that the current frame is not a consonant (Step 1-7-3').

Through such processing, the signal characteristic analyzing unit 170 outputs the index value indicating the consonant-likeness or the information expressing whether or not the current frame is a consonant as the signal analysis information $I_0$.

[Pitch Enhancement Processing (S130)]

The pitch enhancement processing carried out by the voice pitch emphasis apparatus will be described next.

The pitch enhancing unit 130 receives the pitch period and pitch gain output by the pitch analyzing unit 120, the signal analysis information output by the signal characteristic analyzing unit 170, and the time-domain audio signal of the current frame (the input signal) input to the voice pitch emphasis apparatus. Furthermore, for the audio signal sample sequence of the current frame, the pitch enhancing unit 130 outputs a sample sequence of an output signal obtained by enhancing a pitch component corresponding to the pitch period $T_0$ of the current frame so that a degree of enhancement based on the pitch gain $\sigma_0$ is lower for consonant frames (frames where the spectral envelope is flat) than for non-consonant frames (frames where the spectral envelope is not flat).

A specific example will be described hereinafter.

The pitch enhancing unit 130 carries out the pitch enhancement processing on a sample sequence of the audio signal in the current frame, using the input pitch gain $\sigma_0$ of the current frame, the input pitch period $T_0$ of the current frame, and the input signal analysis information $I_0$ of the current frame. Specifically, by obtaining an output signal $X^{new}_n$ through the following Expression (21) for each sample $X_n$ ($L-N \le n \le L-1$) constituting the input sample sequence of the audio signal in the current frame, the pitch enhancing unit 130 obtains a sample sequence of the output signal in the current frame constituted by N samples $X^{new}_{L-N}, \ldots, X^{new}_{L-1}$.

[Formula 7]

$$X_n^{new} = \frac{1}{A}\left[X_n + B_0\sigma_0\gamma_0 X_{n-T_0}\right] \quad (21)$$

However, when the signal analysis information $I_0$ is information expressing whether or not the current frame is a consonant, a damping coefficient $\gamma_0$ is a pre-set value greater than 0 and less than 1 ($0<\gamma_0<1$) if the signal analysis information $I_0$ of the current frame expresses a consonant, and is 1 if the signal analysis information $I_0$ of the current frame expresses a non-consonant ($\gamma_0=1$).

When the signal analysis information $I_0$ of the current frame is an index value indicating the consonant-likeness, the damping coefficient $\gamma_0$ is a value determined on the basis of the signal analysis information $I_0$ of the current frame, and is a value which decreases as the index value $I_0$ of the consonant-likeness increases. To be more specific, for example, the damping coefficient $\gamma_0$ may be found through a predetermined function $\gamma_0=f(I_0)$ in which the value decreases as the index value $I_0$ indicating the consonant-likeness increases, is $\gamma_0=1$ when the index value $I_0$ indicating the consonant-likeness is the minimum value that index value can be, and is $\gamma_0=0$ when the index value $I_0$ indicating the consonant-likeness is the maximum value that index value can be.

Note that Ain Expression (21) is an amplitude correction coefficient found through the following Expression (22).

[Formula 8]

$$A=\sqrt{1+B_0^2\sigma_0^2\gamma_0^2} \quad (22)$$

$B_0$ is a predetermined value, and is ¾, for example.

The pitch enhancement processing in Expression (21) is processing for enhancing the pitch component which takes into account the pitch gain as well as the pitch period, and is furthermore processing for enhancing the pitch component in which a lower degree of enhancement is used for the pitch component in consonant frames than for the pitch component in non-consonant frames.

In other words, when the signal analysis information $I_0$ expresses whether or not a frame is a consonant (whether or not the spectral envelope is flat), the pitch enhancing unit 130 does the following for a frame (a time segment) determined to be a consonant (to have a flat spectral envelope). That is, for each of times n in that frame, a signal is obtained by multiplying a signal $X_{n-T\_0}$ from a time $n-T_0$, further in the past than the time n by the number of samples $T_0$ corresponding to the pitch period of that frame, the pitch gain $\sigma_0$ of that frame, a predetermined constant $B_0$, and a value greater than 0 and less than 1; that signal is then added to a signal $X_n$ at the time n, and a signal including that resulting signal is obtained as an output signal $X^{new}_n$. Additionally, the pitch enhancing unit 130 does the following for a frame (a time segment) determined not to be a consonant (to not have a flat spectral envelope). That is, for each of times n in that frame, a signal is obtained by multiplying the signal $X_{n-T\_0}$ from the time $n-T_0$, further in the past than the time n by the number of samples $T_0$ corresponding to the pitch period of that frame, the pitch gain $\sigma_0$ of that frame, and the predetermined constant $B_0$ ($B_0\sigma_0X_{n-T\_0}$) (this signal corresponds to $\gamma_0=1$ in Expression (21)); that signal is then added to the signal $X_n$ at the time n, and a signal including that resulting signal ($X_n+B_0\sigma_0 X_{n-T\_0}$) is obtained as the output signal $X^{new}_n$.

Additionally, when the signal analysis information $I_0$ is an index value indicating the consonant-likeness (an index value indicating the degree of flatness of the spectral envelope), the pitch enhancing unit 130 does the following. That is, for each of times n in that frame, a signal is obtained by multiplying the signal $X_{n-T\_0}$ from the time $n-T_0$, further in the past than the time n by the number of samples $T_0$ corresponding to the pitch period of a frame including the signal $X_n$, the pitch gain $\sigma_0$ of that frame, and a value $B_0\gamma_0$ that is lower the less like a consonant that frame is (the flatter the spectral envelope is in that frame); that signal ($B_0\sigma_0\gamma_0X_{n-T\_0}$) is then added to the signal $X_n$ at the time n, and a signal including that resulting signal ($X_n+B_0\gamma_0\sigma_0 X_{n-T\_0}$) is obtained as the output signal $X^{new}_n$.

This pitch enhancement processing achieves an effect of reducing a sense of unnaturalness even in consonant frames, and reducing a sense of unnaturalness even if consonant frames and non-consonant frames switch frequently and the degree of emphasis on the pitch component fluctuates from frame to frame.

[First Variation on Pitch Enhancement Processing (S130)]

A first variation on the pitch enhancement processing carried out by the voice pitch emphasis apparatus, and processing pertaining thereto, will be described next.

The voice pitch emphasis apparatus according to the first variation further includes the pitch information storing unit 150.

The pitch enhancing unit 130 receives the pitch period and pitch gain output by the pitch analyzing unit 120, the signal analysis information output by the signal characteristic analyzing unit 170, and the time-domain audio signal of the current frame (the input signal) input to the voice pitch emphasis apparatus, and outputs a sample sequence of an output signal obtained by enhancing the pitch component corresponding to the pitch period $T_0$ of the current frame and the pitch component corresponding to the pitch period of a past frame, with respect to the audio signal sample sequence of the current frame. At this time, the pitch component corresponding to the pitch period $T_0$ of the current frame is enhanced so that that the degree of enhancement based on the pitch gain $\sigma_0$ of the current frame is lower for consonant frames (frames where the spectral envelope is flat) than for non-consonant frames (frames where the spectral envelope is not flat). Note that in the following descriptions, the pitch period and pitch gain of a frame s frames previous to the current frame (s frames in the past) will be indicated as $T_{-s}$ and $\sigma_{-s}$, respectively.

Pitch periods $T_{-1}, \ldots, T_{-\alpha}$ and pitch gains $\sigma_{-1}, \ldots, \sigma_{-\alpha}$ from the previous frame to a frames in the past are stored in the pitch information storing unit 150. Here, $\alpha$ is a predetermined positive integer, and is 1, for example.

The pitch enhancing unit 130 carries out the pitch enhancement processing on the sample sequence of the audio signal in the current frame using the input pitch gain $\sigma_0$ of the current frame; the pitch gain $\sigma_{-\alpha}$ of the frame $\alpha$ frames in the past, read out from the pitch information storing unit 150; the input pitch period $T_0$ of the current frame; the pitch period $T_{-\alpha}$ of the frame $\alpha$ frames in the past, read out from the pitch information storing unit 150; and the input signal analysis information $I_0$ of the current frame.

A specific example will be described hereinafter.

Specific Example 1 of First Variation on Pitch Enhancement Processing

In this specific example, by obtaining the output signal $X^{new}_n$ through the following Expression (23) for each sample $X_n$ ($L-N\leq n\leq L-1$) constituting the input sample sequence of the audio signal in the current frame, the pitch enhancing unit 130 obtains a sample sequence of the output signal in the current frame constituted by N samples $X^{new}_{L-N}, \ldots, X^{new}_{L-1}$.

[Formula 9]

$$X_n^{new} = \frac{1}{A}\left[X_n + B_0\sigma_0\gamma_0 X_{n-T_0} + B_{-\alpha}\sigma_{-\alpha}X_{n-T_{-\alpha}}\right] \tag{23}$$

However, when the signal analysis information $I_0$ is information expressing whether or not the current frame is a consonant, the damping coefficient $\gamma_0$ is a pre-set value greater than 0 and less than 1 ($0<\gamma_0<1$) if the signal analysis information $I_0$ of the current frame expresses a consonant, and is 1 if the signal analysis information $I_0$ of the current frame expresses a non-consonant ($\gamma_0=1$).

When the signal analysis information $I_0$ of the current frame is an index value indicating the consonant-likeness, the damping coefficient $\gamma_0$ is a value determined on the basis of the signal analysis information $I_0$ of the current frame, and is a value which decreases as the index value $I_0$ of the consonant-likeness increases. To be more specific, for example, the damping coefficient $\gamma_0$ may be found through a predetermined function $\gamma_0=f(I_0)$ in which the value decreases as the index value $I_0$ indicating the consonant-likeness increases, is $\gamma_0=1$ when the index value $I_0$ indicating the consonant-likeness is the minimum value that index value can be, and is $\gamma_0=0$ when the index value $I_0$ indicating the consonant-likeness is the maximum value that index value can be.

Note that A in Expression (23) is an amplitude correction coefficient found through the following Expression (24).

[Formula 10]

$$A=\sqrt{1+B_0^2\sigma_0^2\gamma_0^2+B_{-\alpha}^2\sigma_{-\alpha}^2+2B_0B_{-\alpha}\sigma_0\sigma_{-\alpha}\gamma_0} \tag{24}$$

$B_0$ and $B_{-\alpha}$ are predetermined values less than 1, and are ¾ and ¼, for example.

Specific Example 2 of First Variation on Pitch Enhancement Processing

In this specific example, by obtaining the output signal $X^{new}_n$ through the following Expression (25) for each sample $X_n$ ($L-N\le n\le L-1$) constituting the input sample sequence of the audio signal in the current frame, the pitch enhancing unit 130 obtains a sample sequence of the output signal in the current frame constituted by N samples $X^{new}_{L-N}, \ldots, X^{new}_{L-1}$.

[Formula 11]

$$X_n^{new} = \frac{1}{A}\left[X_n + B_0\sigma_0\gamma_0 X_{n-T_0} + B_{-\alpha}\sigma_{-\alpha}\gamma_{-\alpha}X_{n-T_{-\alpha}}\right] \tag{25}$$

Note that the damping coefficient $\gamma_0$ is the same as in Specific Example 1, whereas a damping coefficient $\gamma_{-\alpha}$ is the damping coefficient of a frame α frames in the past. In this specific example, the damping coefficient $\gamma_{-\alpha}$ of a frame a frames in the past is used, and thus the voice pitch emphasis apparatus according to this specific example further includes the damping coefficient storing unit 180. Damping coefficients $\gamma_{-1}, \ldots, \gamma_{-\alpha}$ from the previous frame to α frames in the past are stored in the damping coefficient storing unit 180.

Note that A in Expression (25) is an amplitude correction coefficient found through the following Expression (26).

[Formula 12]

$$A = \sqrt{1 + B_0^2\sigma_0^2\gamma_0^2 + B_{-\alpha}^2\sigma_{-\alpha}^2\gamma_0^2 + 2B_0B_{-\alpha}\sigma_0\sigma_{-\alpha}\gamma_0\gamma_{-\alpha}} \tag{26}$$

$B_0$ and $B_{-\alpha}$ are predetermined values less than 1, and are ¾ and ¼, for example.

Specific Example 3 of First Variation on Pitch Enhancement Processing

In this specific example, by obtaining the output signal $X^{new}_n$ through the following Expression (27) for each sample $X_n$ ($L-N\le n\le L-1$) constituting the input sample sequence of the audio signal in the current frame, the pitch enhancing unit 130 obtains a sample sequence of the output signal in the current frame constituted by N samples $X^{new}_{L-N}, \ldots, X^{new}_{L-1}$.

[Formula 13]

$$X_n^{new} = \frac{1}{A}\left[X_n + B_0\sigma_0\gamma_0 X_{n-T_0} + B_{-\alpha}\sigma_{-\alpha}\gamma_0 X_{n-T_{-\alpha}}\right] \tag{27}$$

Note that the damping coefficient $\gamma_0$ is the same as in Specific Examples 1 and 2.

Also, A in Expression (27) is an amplitude correction coefficient found through the following Expression (28).

[Formula 14]

$$A=\sqrt{1+B_0^2\sigma_0^2\gamma_0^2+B_{-\alpha}^2\sigma_{-\alpha}^2\gamma_0^2 2B_0B_{-\alpha}\sigma_0\sigma_{-\alpha}\gamma_0^2} \tag{28}$$

$B_0$ and $B_{-\alpha}$ are predetermined values less than 1, and are ¾ and ¼, for example.

This specific example describes a configuration in which the damping coefficient $\gamma_0$ of the current frame is used instead of the damping coefficient $\gamma_{-\alpha}$ of the frame α frames in the past used in Specific Example 2. According to this configuration, the voice pitch emphasis apparatus need not include the damping coefficient storing unit 180.

The pitch enhancement processing according to the first variation is a processing for enhancing the pitch component which takes into account the pitch gain as well as the pitch period, a processing for enhancing the pitch component in which a lower degree of enhancement is used for the pitch component in consonant frames than for the pitch component in non-consonant frames, and a processing for enhancing the pitch component corresponding to the pitch period $T_0$ of the current frame, while also enhancing the pitch component corresponding to the pitch period $T_{-\alpha}$ of a past frame with a slightly lower degree of enhancement than that of the pitch component corresponding to the pitch period $T_0$ of the current frame. The pitch enhancement processing according to the first variation can also achieve an effect in which even if the pitch enhancement processing is executed for each of short time segments (frames), discontinuities produced by fluctuations in the pitch period from frame to frame are reduced.

Note that when the signal analysis information to is information expressing whether or not the frame is a consonant, it is preferable that $B_0\gamma_0>B_{-\alpha}$ in Expression (23), that $B_0\gamma_0>B_{-\alpha}\gamma_{-\alpha}$ in Expression (25), and that $B_0>B_{-\alpha}$, in Expression (27). However, the effect of reducing discontinuities produced by fluctuations in the pitch period from frame to frame is achieved even if $B_0\gamma_0 \le B_{-\alpha}$ in Expression (23), $B_0\gamma_0 \le B_{-\alpha}\gamma_{-\alpha}$ in Expression (25), $B_0 \le B_{-\alpha}$ in Expression (27), and so on.

Additionally, when the signal analysis information to is an index value indicating the consonant-likeness, although it is preferable that $B_0 > B_{-\alpha}$ in Equations (23), (25), and (27), the effect of reducing discontinuities produced by fluctuations in the pitch period from frame to frame is achieved even if $B_0 \le B_{-\alpha}$.

Additionally, the amplitude correction coefficient A found through Equations (24), (26), and (28) is for ensuring that the energy of the pitch component is maintained between before and after the pitch enhancement, assuming that the pitch period $T_0$ of the current frame and the pitch period $T_{-\alpha}$ of the frame a frames in the past are sufficiently close values.

Note that the pitch information storing unit 150 updates the stored content so that the pitch period and pitch gain of the current frame can be used as the pitch period and pitch gain of past frames when the pitch enhancing unit 130 processes subsequent frames.

Additionally, when the damping coefficient storing unit 180 is included, the stored content is updated so that the damping coefficient of the current frame can be used as the damping coefficient of past frames when the pitch enhancing unit 130 processes subsequent frames.

[Second Variation on Pitch Enhancement Processing (S130)]

According to the first variation, a sample sequence of an output signal in which the pitch component corresponding to the pitch period $T_0$ of the current frame and the pitch component corresponding to a pitch period of a single frame in the past are enhanced, with respect to the audio signal sample sequence of the current frame. However, the pitch components corresponding to the pitch periods of a plurality of (two or more) past frames may be enhanced. The following will describe an example of enhancing pitch components corresponding to the pitch periods of two past frames as an example of enhancing the pitch components corresponding to the pitch periods of a plurality of past frames, focusing on points different from the first variation.

Pitch periods $T_{-1}, \ldots, T_{-\alpha}, \ldots, T_{-\beta}$ and pitch gains $\sigma_1, \ldots, \sigma_{-\alpha}, \ldots, \sigma_{-\beta}$ from the current frame to β frames in the past are stored in the pitch information storing unit 150. Here, β is a predetermined positive integer greater than a. For example, α is 1 and β is 2.

The pitch enhancing unit 130 carries out the pitch enhancement processing on the sample sequence of the audio signal in the current frame using the input pitch gain $\sigma_{-\alpha}$ of the current frame; the pitch gain $\sigma_{-\alpha}$ of the frame α frames in the past, read out from the pitch information storing unit 150; the pitch gain $\sigma_{-\beta}$ of the frame β frames in the past, read out from the pitch information storing unit 150; the input pitch period $T_0$ of the current frame; the pitch period $T_{-\alpha}$ of the frame a frames in the past, read out from the pitch information storing unit 150; the pitch period $T_{-\beta}$ of the frame β frames in the past, read out from the pitch information storing unit 150; and the input signal analysis information $I_0$ of the current frame.

A specific example will be described hereinafter.

Specific Example 1 of Second Variation on Pitch Enhancement Processing

In this specific example, by obtaining the output signal $X^{new}_n$ through the following Expression (29) for each sample $X_n$ (L−N≤n≤L−1) constituting the input sample sequence of the audio signal in the current frame, the pitch enhancing unit 130 obtains a sample sequence of the output signal in the current frame constituted by N samples $X^{new}_{L-N}, \ldots, X^{new}_{L-1}$.

[Formula 15]

$$X_n^{new} = \frac{1}{A}\left[X_n + B_0\sigma_0\gamma_0 X_{n-T_0} + B_{-\alpha}\sigma_{-\alpha}X_{n-T_{-\alpha}} + B_{-\beta}\sigma_{-\beta}X_{n-T_{-\beta}}\right] \quad (29)$$

However, when the signal analysis information $I_0$ is information expressing whether or not the current frame is a consonant, the damping coefficient $\gamma_0$ is a pre-set value greater than 0 and less than 1 ($0<\gamma_0<1$) if the signal analysis information $I_0$ of the current frame expresses a consonant, and is 1 if the signal analysis information $I_0$ of the current frame expresses a non-consonant ($\gamma_0=1$).

When the signal analysis information $I_0$ of the current frame is an index value indicating the consonant-likeness, the damping coefficient $\gamma_0$ is a value determined on the basis of the signal analysis information $I_0$ of the current frame, and is a value which decreases as the index value $I_0$ of the consonant-likeness increases. To be more specific, for example, the damping coefficient $\gamma_0$ may be found through a predetermined function $\gamma_0=f(I_0)$ in which the value decreases as the index value $I_0$ indicating the consonant-likeness increases, is $\gamma_0=1$ when the index value $I_0$ indicating the consonant-likeness is the minimum value that index value can be, and is $\gamma_0=0$ when the index value $I_0$ indicating the consonant-likeness is the maximum value that index value can be.

Note that A in Expression (29) is an amplitude correction coefficient found through the following Expression (30).

[Formula 16]

$$A=\sqrt{1+B_0^2\sigma_0^2\gamma_0^2+B_{-\alpha}^2\sigma_0^2+B_{-\beta}^2\sigma_{-\beta}^2+E+F+G} \quad (30)$$

where $E=2\,B_0B_{-\alpha}\sigma_0\sigma_{-\alpha}\gamma_0$ $F=2B_0B_{-\beta}\sigma_0\sigma_{-\beta}\gamma_0$ $G=2B_{-\alpha}B_{-\beta}\sigma_{-\alpha}\sigma_{-\beta}$ $B_0$, $B_{-\alpha}$, and $B_{-\beta}$ are predetermined values less than 1, and are ¾, 3/16, and 1/16, for example.

Specific Example 2 of Second Variation on Pitch Enhancement Processing

In this specific example, by obtaining the output signal $X^{new}_n$ through the following Expression (31) for each sample $X_n$ (L−N≤n≤L−1) constituting the input sample sequence of the audio signal in the current frame, the pitch enhancing unit 130 obtains a sample sequence of the output signal in the current frame constituted by N samples $X^{new}_{L-N}, \ldots, X^{new}_{L-1}$.

[Formula 17]

$$X_n^{new} = \frac{1}{A}\left[X_n + B_0\sigma_0\gamma_0 X_{n-T_0} + B_{-\alpha}\sigma_{-\alpha}\gamma_{-\alpha}X_{n-T_{-\alpha}} + B_{-\beta}\sigma_{-\beta}\gamma_{-\beta}X_{n-T_{-\beta}}\right] \quad (31)$$

Note that the damping coefficient γ is the same as in Specific Example 1, the damping coefficient $\gamma_{-\alpha}$ is the damping coefficient of a frame α frames in the past, and the damping coefficient $\gamma_{-\beta}$ is the damping coefficient of a frame β frames in the past. In this specific example, the damping coefficient $\gamma_{-\alpha}$ of a frame α frames in the past and the damping coefficient $\gamma_{-\beta}$ of the frame β frames in the past are used, and thus the voice pitch emphasis apparatus according to this specific example further includes the damping coefficient storing unit 180. Damping coefficients $\gamma_{-1}, \ldots, \gamma_{-\beta}$ from the previous frame to β frames in the past are stored in the damping coefficient storing unit 180.

Note that A in Expression (31) is an amplitude correction coefficient found through the following Expression (32).

[Formula 18]

$$A=\sqrt{1+B_0^2\sigma_0^2\gamma_0^2+B_{-\alpha}^2\sigma_{-\alpha}^2\gamma_{-\alpha}^2+B_{-\beta}^2\sigma_{-\beta}^2\gamma_{-\beta}^2+E+F+G} \quad (32)$$

where $E=2B_0B_{-\beta}\sigma_0\sigma_{-\alpha}\gamma_0\gamma_{-\alpha}$ $F=2B_0B_{-\beta}\sigma_0\sigma_{-\beta}\gamma_0\gamma_{-\beta}$ $G=2B_{-\alpha}B_{-\beta}\sigma_{-\alpha}\sigma_{-\beta}\gamma_{-\alpha}\gamma_{-\beta}$ $B_0$, $B_{-\alpha}$, and $B_{-\beta}$ are predetermined values less than 1, and are ¾, 3/16, and 1/16, for example.

Specific Example 3 of Second Variation on Pitch Enhancement Processing

In this specific example, by obtaining the output signal $X^{new}_n$ through the following Expression (33) for each sample $X_n$ ($L-N\le n\le L-1$) constituting the input sample sequence of the audio signal in the current frame, the pitch enhancing unit 130 obtains a sample sequence of the output signal in the current frame constituted by N samples $X^{new}_{L-N}, \ldots, X^{new}_{L-1}$.

[Formula 19]

$$X_n^{new}=\frac{1}{A}\left[X_n+B_0\sigma_0\gamma_0X_{n-T_0}+B_{-\alpha}\sigma_{-\alpha}\gamma_0X_{n-T_{-\alpha}}+B_{-\beta}\sigma_{-\beta}\gamma_0X_{n-T_{-\beta}}\right] \quad (33)$$

Note that the damping coefficient $\gamma_0$ is the same as in Specific Examples 1 and 2.

Also, A in Expression (33) is an amplitude correction coefficient found through the following Expression (34).

[Formula 20]

$$A=\sqrt{1+B_0^2\sigma_0^2\gamma_0^2+B_{-\alpha}^2\sigma_{-\alpha}^2\gamma_0^2+B_{-\beta}^2\sigma_{-\beta}^2\gamma_0^2+E+F+G} \quad (34)$$

where $E=2B_0B_{-\alpha}\sigma_0\sigma_{-\alpha}\gamma_0^2$ $F=2B_0B_{-\beta}\sigma_0\sigma_{-\beta}\gamma_0^2$ $G=2B_{-\alpha}B_{-\beta}\sigma_{-\alpha}\sigma_{-\beta}\gamma_0^2$ $B_0$, $B_{-\alpha}$, and $B_{-\beta}$ are predetermined values less than 1, and are ¾, 3/16, and 1/16, for example.

This specific example describes a configuration in which the damping coefficient γ of the current frame is used instead of the damping coefficient $\gamma_{-\alpha}$ of the frame α frames in the past and the damping coefficient $\gamma_{-\beta}$ of the frame β frames in the past used in Specific Example 2. According to this configuration, the voice pitch emphasis apparatus need not include the damping coefficient storing unit 180.

Like the pitch enhancement processing according to the first variation, the pitch enhancement processing according to the second variation is processing for enhancing the pitch component which takes into account the pitch gain as well as the pitch period, processing for enhancing the pitch component in which a lower degree of enhancement is used for the pitch component in consonant frames than for the pitch component in non-consonant frames, and processing for enhancing the pitch component corresponding to the pitch period $T_0$ of the current frame, while also enhancing the pitch component corresponding to the pitch period of a past frame with a slightly lower degree of enhancement than that of the pitch component corresponding to the pitch period $T_0$ of the current frame. The pitch enhancement processing according to the second variation can also achieve an effect in which even if the pitch enhancement processing is executed for each of short time segments (frames), discontinuities produced by fluctuations in the pitch period from frame to frame are reduced.

Note that when the signal analysis information $I_0$ is information expressing whether or not the frame is a consonant, it is preferable that $B_0\gamma_0>B_{-\alpha}>B_{-\beta}$ in Expression (29), that $B_0\gamma_0>B_{-\alpha}\gamma_{-\alpha}>B_{-\beta}\gamma_{-\beta}$ in Expression (31), and that $B_0>B_{-\alpha}>B_{-\beta}$ in Expression (33). However, the effect of reducing discontinuities produced by fluctuations in the pitch period from frame to frame is achieved even if $B_0\gamma_0\le B_{-\alpha}$, $B_0\gamma_0\le B_{-\beta}$, $B_{-\alpha}\le B_{-\beta}$, or the like in Expression (29), if $B_0\gamma_0\le B_{-\alpha}\gamma_{-\alpha}$, $B_0\gamma_0\le B_{-\beta}\gamma_{-\beta}$, $B_{-\alpha}\gamma_{-\alpha}\le B_{-\beta}\gamma_{-\beta}$, or the like in Expression (31), if $B_0\le B_{-\alpha}$, $B_0\le B_{-\beta}$, $B_{-\alpha}\le B_{-\beta}$, or the like in Expression (33), and so on.

Additionally, when the signal analysis information $I_0$ is an index value indicating the consonant-likeness, although it is preferable that $B_0>B_{-\alpha}>B_{-\beta}$ in Equations (29), (31), and (33), the effect of reducing discontinuities produced by fluctuations in the pitch period from frame to frame is achieved even if this magnitude relationship is not satisfied.

Additionally, the amplitude correction coefficient A found through Equations (30), (32), and (34) is for ensuring that the energy of the pitch component is maintained between before and after the pitch enhancement, assuming that the pitch period $T_0$ of the current frame, the pitch period $T_{-\alpha}$ of the frame a frames in the past, and the pitch period $T_{-\beta}$ of the frame β frames in the past are sufficiently close values.

(Other Variations on Pitch Enhancement Processing)

Note that one or more predetermined values may be used for the amplitude correction coefficient A, instead of the values found through Equations (22), (24), (26), (28), (30), (32), and (34). When the amplitude correction coefficient A is 1, the pitch enhancing unit 130 may obtain the output signal $X^{new}_n$ through a Formula that does not include the term 1/A in the foregoing equations.

Additionally, instead of a value based on the sample previous by an amount equivalent to each pitch period, added to each sample of the input audio signal, a sample previous by an amount equivalent to each pitch period in an audio signal passed through a low-pass filter may be used, and processing equivalent to low-pass filtering may be carried out, for example.

Additionally, when the pitch gain is lower than a predetermined threshold, the pitch enhancement processing may be carried out without including that pitch component. For example, the configuration may be such that when the pitch gain $\sigma_0$ of the current frame is lower than a predetermined threshold, the pitch component corresponding to the pitch period $T_0$ of the current frame is not included in the output signal, and when the pitch gain of a past frame is lower than the predetermined threshold, the pitch component corresponding to the pitch period of that past frame is not included in the output signal.

Additionally, a configuration may be used in which the signal characteristic analyzing unit 170 obtains an index value indicating the consonant-likeness and outputs that value to the pitch enhancing unit 130 as the signal analysis information $I_0$, and the pitch enhancing unit 130 varies the degree of enhancement (the magnitude of the damping coefficient $\gamma_0$) on the basis of a magnitude relationship between the index value indicating the consonant-likeness and a threshold.

Second Embodiment

The following descriptions will focus on parts different from the first embodiment.

An index value indicating the consonant-likeness which is different from the index value indicating the degree of flatness of the spectral envelope (the index value indicating the consonant-likeness) described in the first embodiment is used in the present embodiment.

The details of the signal characteristic analysis processing (S170) are different from those in the first embodiment.

[Signal Characteristic Analysis Processing (S170)]

As in the first embodiment, information originating from the time-domain audio signal is input to the signal characteristic analyzing unit 170.

The signal characteristic analyzing unit 170 obtains information indicating whether or not the current frame is a consonant, or an index value indicating the consonant-likeness of the current frame, and outputs that information or value to the pitch enhancing unit 130 as the signal analysis information $I_0$.

Additionally, for example, the pitch period $T_0$ of the current frame to a pitch period $T_\varepsilon$ of a frame ε frames in the past are input to the signal characteristic analyzing unit 170, in units of frames of a predetermined length of time (time segments), for example. In this case, the signal characteristic analyzing unit 170 obtains information indicating whether or not the current frame is a consonant, or an index value indicating the consonant-likeness of the current frame, using the pitch period $T_0$ of the current frame to the pitch period $T_{-\varepsilon}$ of the frame ε frames in the past, and outputs that information or value to the pitch enhancing unit 130 as the signal analysis information $I_0$. In other words, in this case, the "information originating from the time-domain audio signal" is from the pitch period $T_0$ of the current frame to the pitch period $T_\varepsilon$ of the frame ε frames in the past (the single-dot-dash line in FIG. 1). In this case, the voice pitch emphasis apparatus further includes the pitch information storing unit 150, and pitch periods $T_{-1}, \ldots, T_{31\ \varepsilon}$ from the previous frame to ε frames in the past are stored in the pitch information storing unit 150. Then, the signal characteristic analyzing unit 170 uses the pitch period $T_0$ of the current frame, input from the pitch analyzing unit 120, and the pitch periods $T_{-1}, \ldots, T_{-\varepsilon}$ from the previous frame to the frame ε frames in the past, read out from the pitch information storing unit 150. ε is a predetermined positive integer. Note that the pitch information storing unit 150 updates the stored content so that the pitch period of the current frame can be used as the pitch period of past frames when the signal characteristic analyzing unit 170 processes subsequent frames.

The signal characteristic analyzing unit 170 obtains the signal analysis information $I_0$ through the signal characteristic analysis processing in the following Example 2-1 to Example 2-5, for example.

(Example 2-1 of Signal Characteristic Analysis Processing: Example of Taking Index Value Indicating Consonant-Likeness as Signal Analysis Information (1))

In this example, using the input pitch period $T_0$ of the current frame to the pitch period $T_{-\varepsilon}$ the frame ε frames in the past, the signal characteristic analyzing unit 170 obtains an index value that increases as the discontinuity of the pitch periods increases (also called a "2-1th index value indicating consonant-likeness" for the sake of simplicity) as the index value indicating the consonant-likeness of the current frame, and outputs the obtained 2-1th index value as the signal analysis information $I_0$.

Using, for example, the pitch period $T_0$, input from the pitch analyzing unit 120, and the pitch periods $T_{-1}, \ldots, T_{-\varepsilon}$ from the previous frame to the frame ε frames in the past, stored in the pitch information storing unit 150, the signal characteristic analyzing unit 170 finds a 2-1th index value δ through Expression (41).

$$\delta=(|T_0-T_{-1}|+|T_{-1}-T_{-2}|+\ldots+|T_{-(\varepsilon-1)}-T_{-\varepsilon}|)/\varepsilon \tag{41}$$

In the case of a vowel, the pitch period has continuity, which means that the difference between consecutive pitch periods is a value close to 0, and the value of δ also tends to decrease. However, in the case of a consonant, the pitch periods lack continuity and the value of δ therefore tends to increase. Therefore, based on this tendency, the 2-1th index value δ is used as the index value indicating the consonant-likeness in this example. Note that it is desirable that ε be a value which is high enough to obtain information sufficient for the determination, but which is low enough to ensure consonants and vowels are not intermixed in the time segments corresponding to $T_0$ to $T_{-\varepsilon}$.

(Example 2-2 of Signal Characteristic Analysis Processing: Example of Taking Index Value Indicating Consonant-Likeness as Signal Analysis Information (2))

In this example, using a sample sequence constituted by the newest J audio signal samples including the N time-domain audio signal samples which have been input, the signal characteristic analyzing unit 170 obtains an index value indicating a fricative-likeness (also called a "2-2th index value indicating the consonant-likeness" for the sake of simplicity) as the index value indicating the consonant-likeness of the current frame, and outputs the obtained 2-2th index value as the signal analysis information $I_0$.

For example, the signal characteristic analyzing unit 170 takes a number of zero-cross points (see Reference Document 3) in the sample sequence constituted by the newest J audio signal samples including the N time-domain audio signal samples which have been input as the 2-2th index value indicating the consonant-likeness, which is an index value indicating the fricative-likeness.

Reference Document 3: L. R. Rabiner et al, *Digital Processing of Speech Signals*, Corona Publishing, 1983, p. 132-137 (translated by Hisayoshi Suzuki)

Additionally, for example, the signal characteristic analyzing unit 170 converts the sample sequence constituted by the newest J audio signal samples including the input N time-domain audio signal samples which have been input into a frequency spectrum series using a modified discrete cosine transform (MDCT); an index value that increases as a ratio of an average energy of samples on a high-frequency side of the frequency spectrum series to an average energy of samples on a low-frequency side of the frequency spectrum series increases is then calculated as the 2-2th index value indicating the consonant-likeness, which is the index value indicating the fricative-likeness.

As described earlier, consonants include fricatives (see Reference Document 1 and Reference Document 2). Therefore, in this example, the index value indicating the fricative-likeness is used as the index value indicating the consonant-likeness.

(Example 2-3 of Signal Characteristic Analysis Processing: Example of Taking Index Value Obtained by Combining Plurality of Index Values as Signal Analysis Information)

In this example, the signal characteristic analyzing unit 170 first obtains the 2-1th index value indicating the consonant-likeness of the current frame through the same method as that of Example 2-1, using the input pitch period $T_0$ of the current frame to the pitch period $T_{-\varepsilon}$ of the frame $\varepsilon$ in the past (Step 2-3-1). The signal characteristic analyzing unit 170 also obtains the 2-2th index value indicating the consonant-likeness of the current frame through the same method as that of Example 2-2, using the sample sequence constituted by the newest J audio signal samples including the N time-domain audio signal samples which have been input (Step 2-3-2). Furthermore, through weighted adding or the like of the 2-1th index value obtained in Step 2-3-1 and the 2-2th index value obtained in Step 2-3-2, the signal characteristic analyzing unit 170 obtains, as an index value indicating the consonant-likeness of the current frame (also called a "2-3th index value" for the sake of simplicity), a value which increases as the value of the 2-1th index value increases and which increases as the value of the 2-2th index value increases; the obtained 2-3th index value is then output as the signal analysis information $I_0$ (Step 2-3-3).

As described earlier, the 2-1th index value and the 2-2th index value are both indices expressing the consonant-likeness. In this example, the index value indicating the consonant-likeness can be set more flexibly by combining the two index values.

Examples 2-1 to 2-3 of the signal characteristic analysis processing describe examples of taking an index value indicating the consonant-likeness as the signal analysis information. From now, examples of taking information expressing whether or not the current frame is a consonant as the signal analysis information will be described.

(Example 2-4 of Signal Characteristic Analysis Processing: Example of Taking Information Expressing Whether or not Frame is Consonant as Signal Analysis Information (1))

In this example, the signal characteristic analyzing unit 170 first obtains any one of the 2-1th to 2-3th index values indicating the consonant-likeness of the current frame through the same method as any one of those according to Example 2-1 to Example 2-3. Next, when any one of the obtained 2-1th to 2-3th index values is greater than or equal to a pre-set threshold or exceeds the threshold, the signal characteristic analyzing unit 170 outputs information expressing that the current frame is a consonant (the "information expressing whether or not the current frame is a consonant" corresponding to the "2-1th index value" to the "2-3th index value" will also be called "2-1th information" to "2-3th information", respectively, for the sake of simplicity) as the signal analysis information $I_0$; whereas when such is not the case, any one of the 2-1th to 2-3th information expressing that the current frame is not a consonant is output as the signal analysis information $I_0$.

(Example 2-5 of Signal Characteristic Analysis Processing: Example of Taking Information Expressing Whether or not Frame is Consonant as Signal Analysis Information (2))

In this example, first, the signal characteristic analyzing unit 170 obtains the 2-1th index value indicating the consonant-likeness of the current frame through the same method as that of Example 2-1 (Step 2-5-1); and when the 2-1th index value obtained in Step 5-1 is greater than or equal to a pre-set threshold or exceeds the threshold, the 2-1th information expressing that the current frame is a consonant is obtained, whereas when such is not the case, the 2-1th information expressing that the current frame is not a consonant is obtained (Step 2-5-2). Additionally, the signal characteristic analyzing unit 170 obtains the 2-2th index value indicating the consonant-likeness of the current frame through the same method as that of Example 2-2 (Step 2-5-3); and when the 2-2th index value obtained in Step 2-5-3 is greater than or equal to a pre-set threshold or exceeds the threshold, the second information expressing that the current frame is a consonant is obtained, whereas when such is not the case, the 2-2th information expressing that the current frame is not a consonant is obtained (Step 2-5-4). Furthermore, when the 2-1th information obtained in Step 2-5-2 expresses a consonant and the 2-2th information obtained in Step 2-5-4 expresses a consonant, the signal characteristic analyzing unit 170 outputs information expressing that the current frame is a consonant (also called "2-4th information" for the sake of simplicity) as the signal analysis information $I_0$, whereas when such is not the case, outputs the 2-4th information expressing that the current frame is not a consonant as the signal analysis information $I_0$ (Step 2-5-5).

Note that instead of the foregoing Step 2-5-5, when the 2-1th information obtained in Step 2-5-2 expresses a consonant or the 2-2th information obtained in Step 2-5-4 expresses a consonant, the signal characteristic analyzing unit 170 may output the 2-4th information expressing that the current frame is a consonant as the signal analysis information $I_0$, and when such is not the case, may output the 2-4th information indicating that the current frame is not a consonant as the signal analysis information $I_0$ (Step 2-5-5').

Through such processing, the signal characteristic analyzing unit 170 outputs the index value indicating the consonant-likeness or the information expressing whether or not the current frame is a consonant as the signal analysis information $I_0$.

<Pitch Enhancing Unit 130>

The pitch enhancement processing (S130) by the pitch enhancing unit 130 is the same as in the first embodiment.

In other words, when the signal analysis information $I_0$ expresses whether or not the current frame is a consonant, the pitch enhancing unit 130 according to the present embodiment does the following for a frame (a time segment) determined to be a consonant. That is, for each of times n in that frame, a signal is obtained by multiplying a signal $X_{n-T\_0}$ from a time $n-T_0$, further in the past than the time n by the number of samples $T_0$ corresponding to the pitch period of that frame, the pitch gain $\sigma_0$ of that frame, a predetermined constant $B_0$, and a value greater than 0 and less than 1; that signal is then added to a signal $X_n$ at the time n, and a signal including that resulting signal is obtained as an output signal $X^{new}_n$. Additionally, the pitch enhancing unit 130 does the following for a frame (a time segment) determined not to be a consonant. That is, for each of times n in that frame, a signal is obtained by multiplying the signal $X_{n-T\_0}$ from the time $n-T_0$, further in the past than the time n by the number of samples $T_0$ corresponding to the pitch period of that frame, the pitch gain $\sigma_0$ of that frame, and the predetermined constant $B_0$ ($B_0\sigma_0X_{n-T\_0}$) (this signal corresponds to $\gamma_0=1$ in Expression (21)); that signal is then added to the signal $X_n$ at the time n, and a signal including that resulting signal ($X_n+B_0\sigma_0X_{n-T\_0}$) is obtained as the output signal $X^{new}_n$.

Additionally, when the signal analysis information to is an index value indicating the consonant-likeness, the pitch enhancing unit 130 does the following. That is, for each of times n in that frame, a signal is obtained by multiplying the signal $X_{n-T\_0}$ from the time $n-T_0$, further in the past than the time n by the number of samples $T_0$ corresponding to the pitch period of the frame including the frame signal $X_n$, the pitch gain $\sigma_0$ of that frame, and a value $B_0\gamma_0$ that is lower the more like a consonant that frame is ($B_0\sigma_0\gamma_0X_{n-T\_0}$); that signal is then added to the signal $X_n$ at the time n, and a signal including that resulting signal ($X_n+B_0\gamma_0\sigma_0X_{n-T\_0}$) is obtained as the output signal $X^{new}_n$.

Note that when the same pitch enhancement processing as that of the first variation and the second variation on the first embodiment is carried out, the pitch information storing unit 150 may be shared in the signal characteristic analysis processing (S170) and the pitch enhancement processing (S130). When the same pitch enhancement processing as that of the first variation and the second variation on the first embodiment is carried out, ε may be greater than α, or ε may be less than α, or overlapping parts where ε=α may be shared to the greatest extent possible. Likewise, when the same pitch enhancement processing as that of the second variation on the first embodiment is carried out, ε may be greater than β, or ε may be less than β, or overlapping parts where ε=β may be shared to the greatest extent possible.

<Effects>

According to the configuration described above, the same effects as those of the first embodiment can be achieved.

Third Embodiment

The following descriptions will focus on parts different from the first embodiment.

In the present embodiment, the index value indicating the consonant-likeness or the information expressing whether or not the current frame is a consonant is obtained using the index value indicating the degree of flatness of the spectral envelope described in the first embodiment along with the index value indicating the consonant-likeness described in the second embodiment.

The details of the signal characteristic analysis processing (S170) are different from those in the first embodiment. For the sake of simplicity, in the following, any one of the 1-1th to 1-5th index values indicating the consonant-likeness, which are the index values indicating the degree of flatness of the spectral envelope described in the first embodiment, will be called a first index value; any one of the 2-1th to 2-3th index values indicating the consonant-likeness described in the second embodiment will be called a second index value indicating the consonant-likeness; and an index value indicating the consonant-likeness, obtained through the signal characteristic analysis processing (S170) using the first index value indicating the consonant-likeness and the second index value indicating the consonant-likeness, will be called a third index value indicating the consonant-likeness.

[Signal Characteristic Analysis Processing (S170)]

The signal characteristic analyzing unit 170 obtains the index value indicating the consonant-likeness or the information expressing whether or not the current frame is a consonant on the basis of the index value indicating the degree of flatness of the spectral envelope described in the first embodiment and the index value indicating the consonant-likeness described in the second embodiment, and outputs that value or information to the pitch enhancing unit 130 as the signal analysis information. The signal characteristic analyzing unit 170 obtains the signal analysis information $I_0$ through the signal characteristic analysis processing in the following Example 3-1 to Example 3-4, for example.

(Example 3-1 of Signal Characteristic Analysis Processing: Example of Taking Index Value Obtained by Combining Index Value Indicating Degree of Flatness of Spectral Envelope (First Index Value Indicating Consonant-Likeness) and Second Index Value Indicating Consonant-Likeness as Third Index Value Indicating Consonant-Likeness, and Taking Third Index Value Itself as Signal Analysis Information)

In this example, first, the signal characteristic analyzing unit 170 obtains the index value indicating the degree of flatness of the spectral envelope of the current frame (the first index value indicating the consonant-likeness) using the same method as any of those in Examples 1-1 to 1-5 described in the first embodiment (Step 3-1-1). Additionally, the signal characteristic analyzing unit 170 obtains the second index value indicating the consonant-likeness of the current frame through the same methods as those according to Example 2-1 to Example 2-3 described in the second embodiment (Step 3-1-2). Furthermore, through weighted adding or the like of the index value indicating the degree of flatness of the spectral envelope obtained in Step 3-1-1 (the first index value indicating the consonant-likeness) and the second index value indicating the consonant-likeness obtained in Step 3-1-2, the signal characteristic analyzing unit 170 obtains, as the third index value indicating the consonant-likeness of the current frame, a value which increases as the value of the index value indicating the degree of flatness of the spectral envelope (the first index value indicating the consonant-likeness) increases and which increases as the value of the second index value indicating the consonant-likeness increases; the obtained third index value indicating the consonant-likeness is then output as the signal analysis information $I_0$ (Step 3-1-3).

(Example 2-3 of Signal Characteristic Analysis Processing: Example of Using, as Signal Analysis Information, Information Obtained by Comparing Third Index Value, Obtained by Combining Index Value Indicating Degree of Flatness of Spectral Envelope (First Index Value Indicating Consonant-Likeness) and Second Index Value Indicating Consonant-Likeness, with Threshold)

In this example, the signal characteristic analyzing unit 170 first obtains the third index value indicating the consonant-likeness of the current frame through the same method as that according to Example 3-1 (Step 3-2-1). Next, when the third index value indicating the consonant-likeness, obtained in Step 3-2-1, is greater than or equal to a predetermined threshold or exceeds the threshold, the signal characteristic analyzing unit 170 outputs third information expressing that the current frame is a consonant as the signal analysis information $I_0$, whereas when such is not the case, the third information expressing that the current frame is not a consonant is output as the signal analysis information $I_0$.

(Example 3-3 of Signal Characteristic Analysis Processing: Example of Taking Information Expressing Whether or not Current Frame is a Consonant or Spectral Envelope is Flat as Signal Analysis Information)

In this example, first, the signal characteristic analyzing unit 170 obtains an index value indicating the degree of flatness of the spectral envelope of the current frame (the first index value indicating the consonant-likeness) through the same method as that in any of Examples 1-1 to 1-5 described in the first embodiment (Step 3-3-1); then, when the first index value obtained in Step 3-3-1 is greater than or equal to a pre-set threshold or exceeds the threshold, first information expressing that the spectral envelope of the current frame is flat (that the current frame is a consonant) is obtained, whereas when such is not the case, first information expressing that the spectral envelope of the current frame is not flat (that the current frame is not a consonant) is obtained (Step 3-3-2). Additionally, the signal characteristic analyzing unit 170 obtains the second index value indicating the consonant-likeness through the same method as that of any one of Examples 2-1 to 2-3 described in the second embodiment (Step 3-3-3); and when the second index value obtained in Step 3-3-3 is greater than or equal to a pre-set threshold or exceeds the threshold, the second information expressing that the current frame is a consonant is obtained, whereas when such is not the case, the second information expressing that the current frame is not a consonant is obtained (Step 3-3-4). Furthermore, when the first information obtained in Step 3-3-2 expresses that the spectral envelope is flat (a consonant) or the second information obtained in Step 3-3-4 expresses a consonant, the signal characteristic analyzing unit 170 outputs third information expressing that the current frame is a consonant as the signal analysis information $I_0$, whereas when such is not the case, the third information expressing that the current frame is not a consonant is output as the signal analysis information $I_0$.

(Example 3-4 of Signal Characteristic Analysis Processing: Example of Taking Information Expressing Whether or not Current Frame is a Consonant and Spectral Envelope is Flat as Signal Analysis Information)

In this example, first, the signal characteristic analyzing unit 170 obtains the first index value indicating the consonant-likeness of the current frame through the same method as that in any of Examples 1-1 to 1-5 described in the first embodiment (Step 3-4-1); then, when the index value obtained in Step 3-4-1 is greater than or equal to a pre-set threshold or exceeds the threshold, the first information expressing that the spectral envelope of the current frame is flat (that the current frame is a consonant) is obtained, whereas when such is not the case, the first information expressing that the spectral envelope of the current frame is not flat (that the current frame is not a consonant) is obtained (Step 3-4-2). Additionally, the signal characteristic analyzing unit 170 obtains the second index value indicating the consonant-likeness of the current frame through the same method as that of any one of Examples 2-1 to 2-3 described in the second embodiment (Step 3-4-3); and when the index value obtained in Step 3-4-3 is greater than or equal to a pre-set threshold or exceeds the threshold, the second information expressing that the current frame is a consonant is obtained, whereas when such is not the case, the second information expressing that the current frame is not a consonant is obtained (Step 3-4-4). Furthermore, when the first information obtained in Step 3-4-2 expresses that the spectral envelope is flat (a consonant) or the second information obtained in Step 3-4-4 expresses a consonant, the signal characteristic analyzing unit 170 outputs third information expressing that the current frame is a consonant as the signal analysis information $I_0$, whereas when such is not the case, the third information expressing that the current frame is not a consonant is output as the signal analysis information $I_0$.

<Pitch Enhancing Unit 130>

The pitch enhancement processing (S130) by the pitch enhancing unit 130 is the same as in the first embodiment.

In other words, when the signal analysis information $I_0$ expresses whether or not the current frame is a consonant (that is, is the third information), the pitch enhancing unit 130 according to the present embodiment does the following for a frame (a time segment) in which the spectral envelope of the signal $X_n$ is flat and/or the frame has been determined to be a consonant. That is, for each of times n in that frame, a signal is obtained by multiplying a signal $X_{n-T\_0}$ from a time $n-T_0$, further in the past than the time n by the number of samples $T_0$ corresponding to the pitch period of that frame, the pitch gain $\sigma_0$ of that frame, a predetermined constant $B_0$, and a value greater than 0 and less than 1; that signal is then added to a signal $X_n$ at the time n, and a signal including that resulting signal is obtained as an output signal $X^{new}_n$. Additionally, the pitch enhancing unit 130 does the following for a frame for which a different determination has been made. That is, for each of times n in that frame, a signal is obtained by multiplying the signal $X_{n-T\_0}$ from the time $n-T_0$, further in the past than the time n by the number of samples $T_0$ corresponding to the pitch period of that frame, the pitch gain $\sigma_0$ of that frame, and the predetermined constant $B_0$ ($B_0\sigma_0X_{n-T\_0}$) (this signal corresponds to $\gamma_0=1$ in Expression (21)); that signal is then added to the signal $X_n$ at the time n, and a signal including that resulting signal ($X_n+B_0\sigma_0X_{n-T\_0}$) is obtained as the output signal $X^{new}_n$ (this corresponds to Examples 3-3 and 3-4). Note that in Example 3-2, the third index value obtained by combining the index value indicating the degree of flatness of the spectral envelope (the first index value indicating the consonant-likeness) and the second index value indicating the consonant-likeness is compared with a threshold, and this threshold determination corresponds to a determination as to whether or not the spectral envelope of the signal $X_n$ is flat and/or the frame is a consonant.

Additionally, the pitch enhancing unit 130 does the following when the signal analysis information $I_0$ is an index value indicating the consonant-likeness (that is, is the third index value). That is, for each of times n in that frame, a signal is obtained by multiplying the signal $X_{n-T\_0}$ from the time $n-T_0$, further in the past than the time n by the number of samples $T_0$ corresponding to the pitch period of the frame including the signal $X_n$, the pitch gain $\sigma_0$ of that frame, and a value $B_0\gamma_0$ that is lower the flatter the spectral envelope of that frame is and the more like a consonant that frame is ($B_0\sigma_0\gamma_0X_{n-T\_0}$); that signal is then added to the signal $X_n$ at the time n, and a signal including that resulting signal ($X_n+B_0\gamma_0\sigma_0X_{n-T\_0}$) is obtained as the output signal $X^{new}_n$ (this corresponds to Example 3-1).

<Effects>

By employing such a configuration, the same effects as those of the first embodiment can be achieved. Furthermore, according to the present embodiment, a more appropriate index value indicating the consonant-likeness can be obtained by taking into account the second index value in addition to the first index value (the index value indicating the degree of flatness of the spectral envelope).

Other Embodiments

Figure 3:
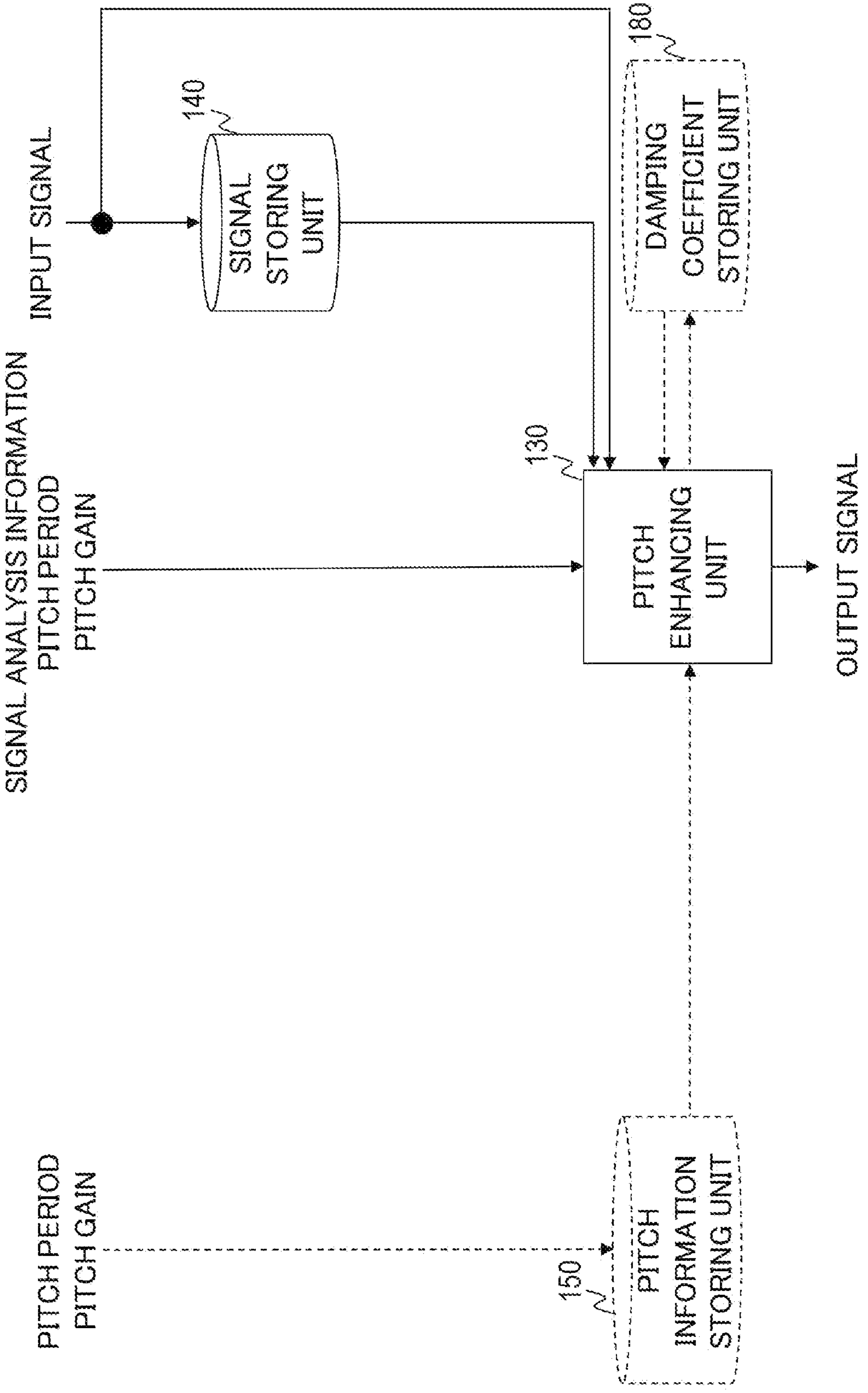
FIG. 3 is a function block diagram illustrating a pitch emphasis apparatus according to another variation.
Figure 4:
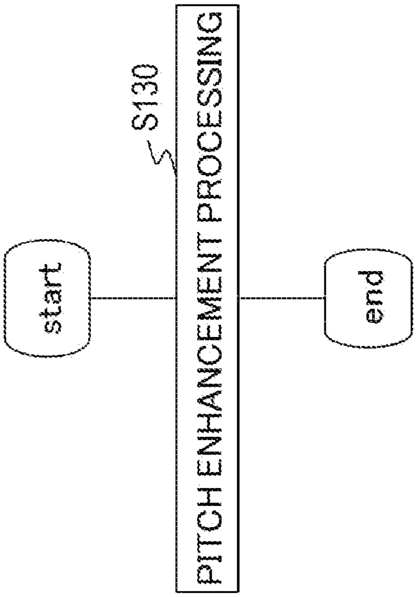
FIG. 4 is a diagram illustrating an example of a flow of processing by the pitch emphasis apparatus according to another variation.

When the pitch period, the pitch gain, and the signal analysis information of each frame have been obtained through decoding processing or the like carried out outside the voice pitch emphasis apparatus, the voice pitch emphasis apparatus may employ the configuration illustrated in FIG. 3, and enhance the pitch on the basis of the pitch period, the pitch gain, and the signal analysis information obtained outside the voice pitch emphasis apparatus. FIG. 4 illustrates a flow of processing in this case. In this example, it is not necessary to include the autocorrelation function calculating unit 110, the pitch analyzing unit 120, the signal characteristic analyzing unit 170, and the autocorrelation function storing unit 160 included in the voice pitch emphasis apparatus according to the first embodiment, the second embodiment, the third embodiment, and the variations thereon; the pitch enhancing unit 130 may carry out the pitch enhancement processing (S130) using a pitch period, a pitch gain, and signal analysis information input to the voice pitch emphasis apparatus, instead of the pitch period and the pitch gain output by the pitch analyzing unit 120 and the signal analysis information output by the signal characteristic analyzing unit 170. By employing such a configuration, the amount of computational processing carried out by the voice pitch emphasis apparatus itself can be reduced as compared to the first embodiment, the second embodiment, the third embodiment, and the variations thereon. However, the voice pitch emphasis apparatus according to the first embodiment, the second embodiment, the third embodiment, and the variations thereon can obtain the pitch period, the pitch gain, and the signal analysis information regardless of the frequency at which the pitch period, the pitch gain, and the signal analysis information are obtained outside the voice pitch emphasis apparatus, and can therefore carry out the pitch enhancement processing in units of frames that are extremely short in terms of time. Using the above-described example of a sampling frequency of 32 kHz, assuming N is 32, for example, the pitch enhancement processing can be carried out in units of 1-ms frames.

Although the foregoing descriptions assume that the pitch enhancement processing is carried out on an audio signal itself, the present invention may be applied as pitch enhancement processing for a linear predictive residual in a configuration that carries out linear prediction synthesis after carrying out the pitch enhancement processing on a linear predictive residual, such as described in Non-patent Literature 1. In other words, the present invention may be applied to a signal originating from an audio signal, such as a signal obtained by analyzing or processing an audio signal, as opposed to the audio signal itself The present invention is not limited to the foregoing embodiments and variations. For example, the various above-described instances of processing may be executed not only in chronological order as per the descriptions, but may also be executed in parallel or individually, depending on the processing performance of the device executing the processing, or as necessary. Other changes may be made as appropriate to the extent that they do not depart from the essential spirit of the present invention.

<Program and Recording Medium>

The various processing functions in the various devices described in the above embodiments and variations may be implemented by a computer. In this case, the processing details of the functions which each device should have are denoted in a program. By executing this program on the computer, the various processing functions of each of the devices, described above, are implemented on the computer.

The program denoting these processing details can be recorded on a computer-readable recording medium. The computer-readable recording medium may be any type of recording medium, such as a magnetic recording device, an optical disk, a magneto-optical recording medium, semiconductor memory, or the like.

This program is distributed by selling, transferring, or lending a portable recording medium, such as a DVD, a CD-ROM, or the like on which the program is recorded. Furthermore, this program may be distributed by storing the program in a storage device of a server computer and transferring the program from the server computer to other computers over a network.

The computer that executes such a program first temporarily stores the program recorded in the portable recording medium or the program transferred from the server computer in its own storage unit, for example. Then, when the processing is to be executed, the computer reads out the program stored in its own storage unit and executes the processing according to the read program. In another embodiment of the program, the computer may read out the program directly from a portable recording medium and execute the processing according to the program. Furthermore, the computer may execute the processing according to the received program sequentially whenever the program is transferred from the server computer to the computer. The configuration may be such that the above-described processing is executed by an ASP (Application Service Provider) type service, where the program is not transferred from the server computer to this computer, but the processing functions are realized only by instructing the execution and obtaining the results. Note that it is assumed that the program includes information provided for processing carried out by a computer and that is equivalent to the program (data or the like that is not direct commands to the computer but has properties that define the processing of the computer).

In addition, although each device is configured by having a predetermined program executed on a computer, at least part of these processing details may be implemented using hardware.

What is claimed is:

1. A pitch emphasis apparatus that obtains an output signal having little unnaturalness to listeners by executing pitch enhancement processing on each of time segments of an input signal, the input signal being an audio signal, the apparatus comprising:

a pitch enhancing unit that carries out the following as the pitch enhancement processing:

for a time segment in which the signal has been determined to be a consonant, obtaining an output signal for each of times in the time segment, the output signal being a signal including a signal obtained by adding (1) a signal obtained by multiplying the signal of a time $n-T_0$, further in the past than a time n by a number of samples $T_0$ corresponding to a pitch period of the time segment, a pitch gain $\sigma_0$ of the time segment, a predetermined constant $B_0$, and a value greater than 0 and less than 1, to (2) the signal of the time n, and for a time segment in which the signal has been determined not to be a consonant, obtaining an output signal for each of times in the time segment, the output signal being a signal including a signal obtained by adding (1) a signal obtained by multiplying the signal of a time $n-T_0$, further in the past than a time n by the number of samples $T_0$ corresponding to the pitch period of the time segment, the pitch gain $\sigma_0$ of the time segment, and the predetermined constant $B_0$, to (2) the signal of the time n.

2. A pitch emphasis apparatus that obtains an output signal having little unnaturalness to listeners by executing pitch enhancement processing on each of time segments of an input signal, the input signal being an audio signal, the apparatus comprising:

a pitch enhancing unit that carries out the following as the pitch enhancement processing:

obtaining an output signal for each of times n in each of the time segments, the output signal being a signal including a signal obtained by adding (1) a signal obtained by multiplying the signal of a time $n-T_0$, further in the past than a time n by a number of samples $T_0$ corresponding to a pitch period of the time segment, a pitch gain $\sigma_0$ of the time segment, and a value that becomes smaller as the consonant-likeness of the time segment becomes higher, to (2) the signal of the time n.

3. A pitch emphasis method that obtains an output signal having little unnaturalness to listeners by executing pitch enhancement processing on each of time segments of an input signal, the input signal being an audio signal, the method comprising:

a pitch enhancing step of carrying out the following as the pitch enhancement processing:

for a time segment in which the signal has been determined to be a consonant, obtaining an output signal for each of times in the time segment, the output signal being a signal including a signal obtained by adding (1) a signal obtained by multiplying the signal of a time $n-T_0$, further in the past than a time n by a number of samples $T_0$ corresponding to a pitch period of the time segment, a pitch gain $\sigma_0$ of the time segment, a predetermined constant $B_0$, and a value greater than 0 and less than 1, to (2) the signal of the time n, and for a time segment in which the signal has been determined not to be a consonant, obtaining an output signal for each of times in the time segment, the output signal being a signal including a signal obtained by adding (1) a signal obtained by multiplying the signal of a time $n-T_0$, further in the past than a time n by the number of samples $T_0$ corresponding to the pitch period of the time segment, the pitch gain $\sigma_0$ of the time segment, and the predetermined constant $B_0$, to (2) the signal of the time n.

4. A pitch emphasis method that obtains an output signal by having little unnaturalness to listeners executing pitch enhancement processing on each of time segments of an input signal, the input signal being an audio signal, the method comprising:

a pitch enhancing step of carrying out the following as the pitch enhancement processing:

obtaining an output signal for each of times n in each of the time segments, the output signal being a signal including a signal obtained by adding (1) a signal obtained by multiplying the signal of a time $n-T_0$, further in the past than a time n by a number of samples $T_0$ corresponding to a pitch period of the time segment, a pitch gain co of the time segment, and a value that becomes smaller as the consonant-likeness of the time segment becomes higher, to (2) the signal of the time n.

5. A non-transitory computer-readable recording medium that records a program for causing a computer to function as the pitch emphasis apparatus according to claim 1.

6. A non-transitory computer-readable recording medium that records a program for causing a computer to function as the pitch emphasis apparatus according to claim 2.

* * * * *